(12) United States Patent
Oba et al.

(10) Patent No.: US 7,409,231 B2
(45) Date of Patent: Aug. 5, 2008

(54) INFORMATION PROCESSING APPARATUS AND METHOD, AND RECORDING MEDIUM

(75) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 10/399,933

(22) PCT Filed: Aug. 28, 2002

(86) PCT No.: PCT/JP02/08645

§ 371 (c)(1),
(2), (4) Date: Oct. 20, 2003

(87) PCT Pub. No.: WO03/021876

PCT Pub. Date: Mar. 13, 2003

(65) Prior Publication Data

US 2004/0048570 A1    Mar. 11, 2004

(30) Foreign Application Priority Data

Aug. 28, 2001    (JP)    ............................. 2001-257310

(51) Int. Cl.
*H04M 1/00*    (2006.01)
*H04B 7/00*    (2006.01)

(52) U.S. Cl. ................ 455/566; 455/556.1; 455/557; 455/41.2

(58) Field of Classification Search ................ 455/41.2, 455/41.1, 67.11, 566, 550.1, 556.1, 556.2
See application file for complete search history.

(56) References Cited

U.S. PATENT DOCUMENTS 6,176,425 B1    1/2001    Harrison et al.

(Continued)

FOREIGN PATENT DOCUMENTS

AU    199891322    11/1998

(Continued)

OTHER PUBLICATIONS

Patent Abstract of GB 2331204, May 12, 1999.

(Continued)

*Primary Examiner*—Yuwen Pan
(74) *Attorney, Agent, or Firm*—Finnegan, Henderson, Farabow, Garrett & Dunner, L.L.P.

(57) ABSTRACT

The present invention relates to an information processing apparatus and method, a recording medium, and a program which allow a user to immediately and easily know whether or not transmission of desired data is completed and the direction of transmission of the data. Readers/writers 23-1 through 23-4 and RF tags 24-1 through 24-4 detect an electronic device which is placed adjacent thereto and the direction in which the electronic device is placed. The readers/writers 23-1 through 23-4 and the RF tags 24-1 through 24-4 obtain identification information of the electronic device when the electronic device placed adjacent thereto is detected. A communication unit 22 communicates with the electronic device over a network based on the identification information. A CPU 11 controls display so that an image corresponding to at least one of the communication status of data communicated over the network and the content of the data is displayed on an LCD 17 based on the direction in which the electronic device is placed. The present invention is applicable to an information processing apparatus such as a personal computer, a PDA, or a cellular telephone.

11 Claims, 28 Drawing Sheets

U.S. PATENT DOCUMENTS

| | | | |
|---|---|---|---|
| 6,351,645 B1 * | 2/2002 | Suzuki et al. | 455/458 |
| 6,366,212 B1 * | 4/2002 | Lemp | 340/815.4 |
| 6,748,195 B1 * | 6/2004 | Phillips | 455/41.2 |
| 6,982,728 B1 * | 1/2006 | Nicolas et al. | 345/649 |
| 7,120,317 B1 * | 10/2006 | Wu et al. | 382/296 |
| 2003/0125092 A1 * | 7/2003 | Burnhouse et al. | 455/566 |

FOREIGN PATENT DOCUMENTS

| | | |
|---|---|---|
| JP | 11-143604 | 5/1999 |
| JP | 11-296270 | 10/1999 |
| JP | 2000-122635 | 4/2000 |
| JP | 2001-144781 | 5/2001 |
| JP | 2001-156704 | 6/2001 |
| JP | 2001-202175 | 7/2001 |

OTHER PUBLICATIONS

Akira Nihei, "Keitai Denwa wa Benri na Saifu ni Pocket ni Keitai Dakega Areba li Seikatsu ga Kuru", ASCII, Jul. 1, 2001, vol. 25, No. 7, pp. 278-279.

* cited by examiner

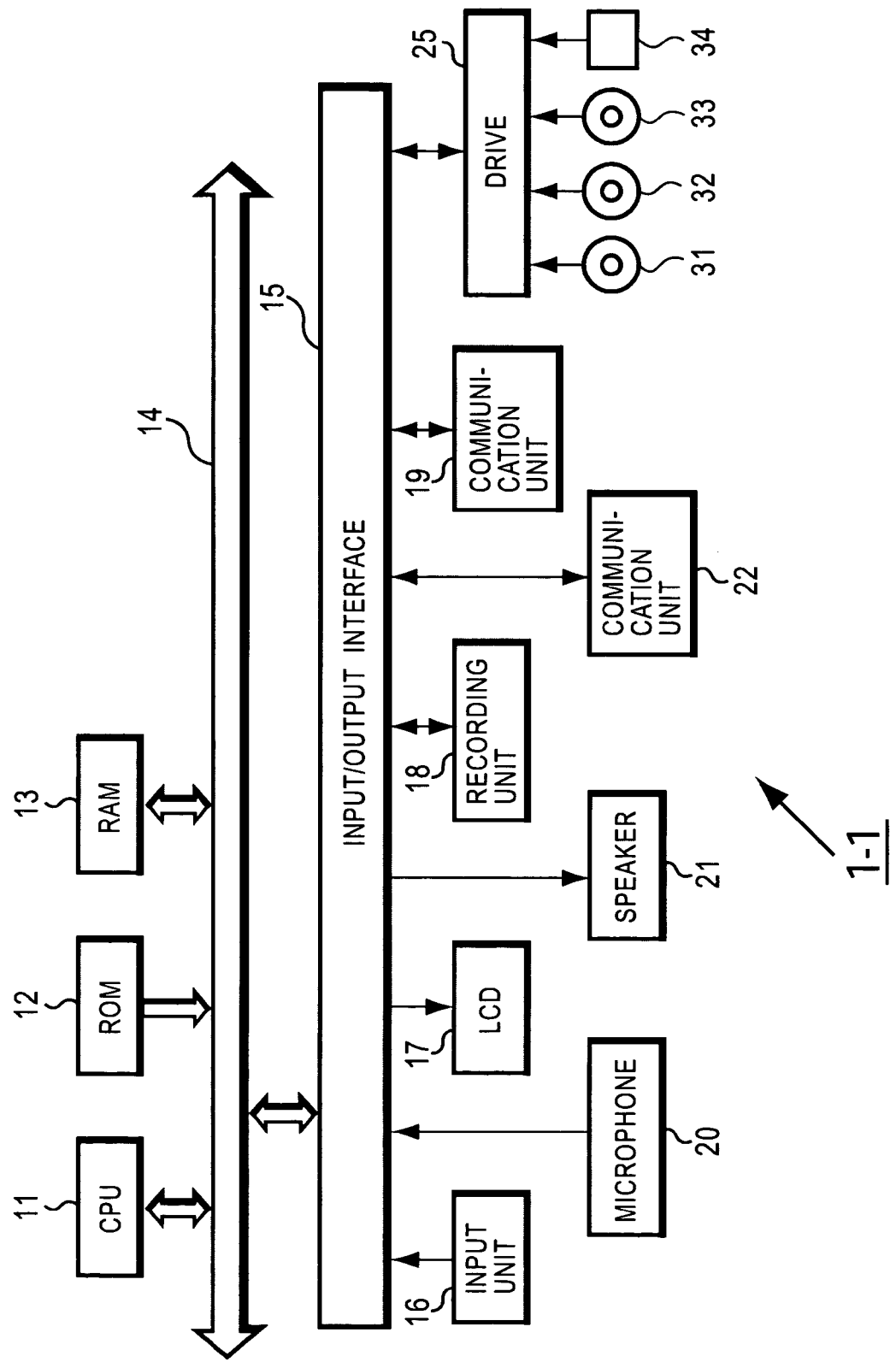

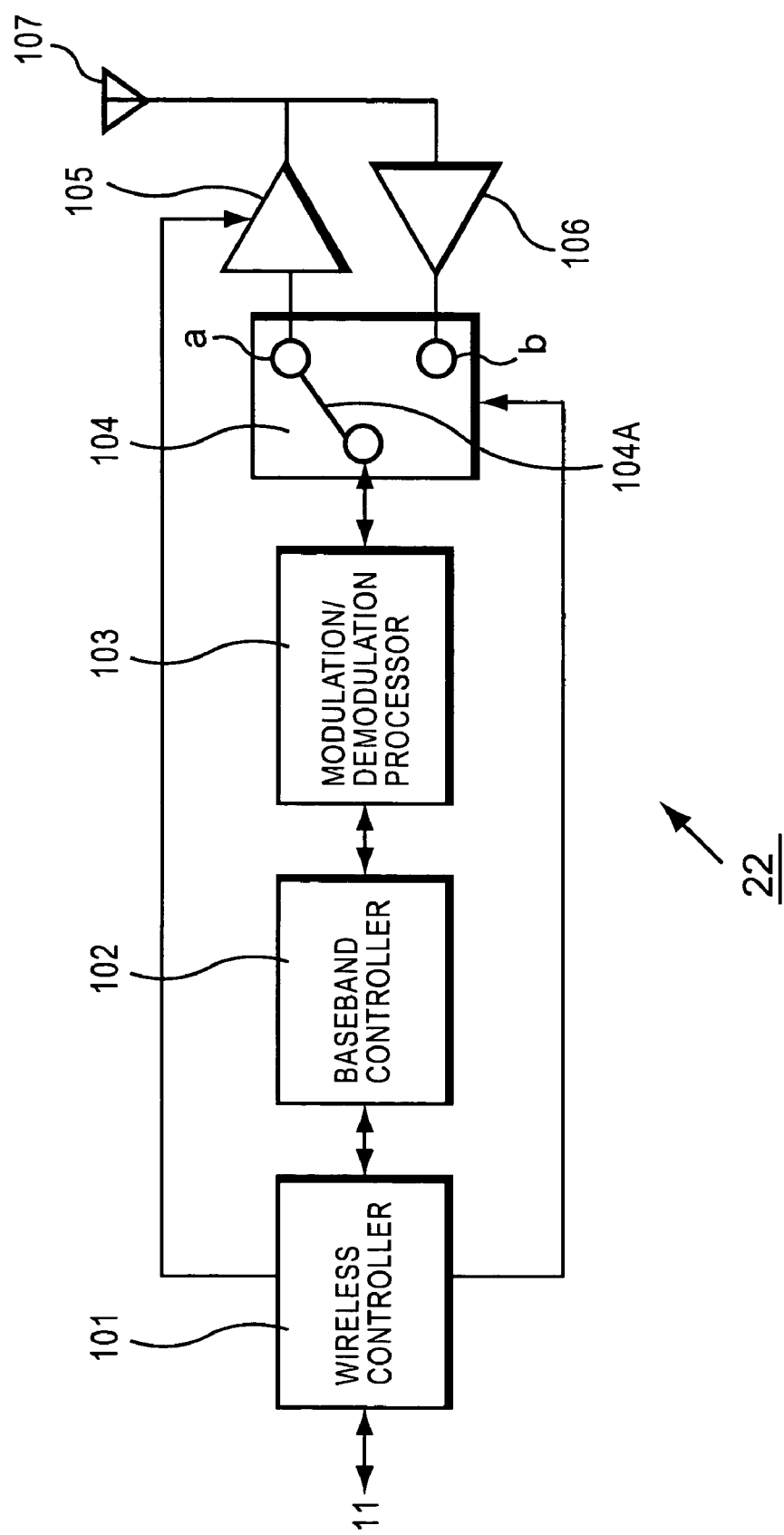

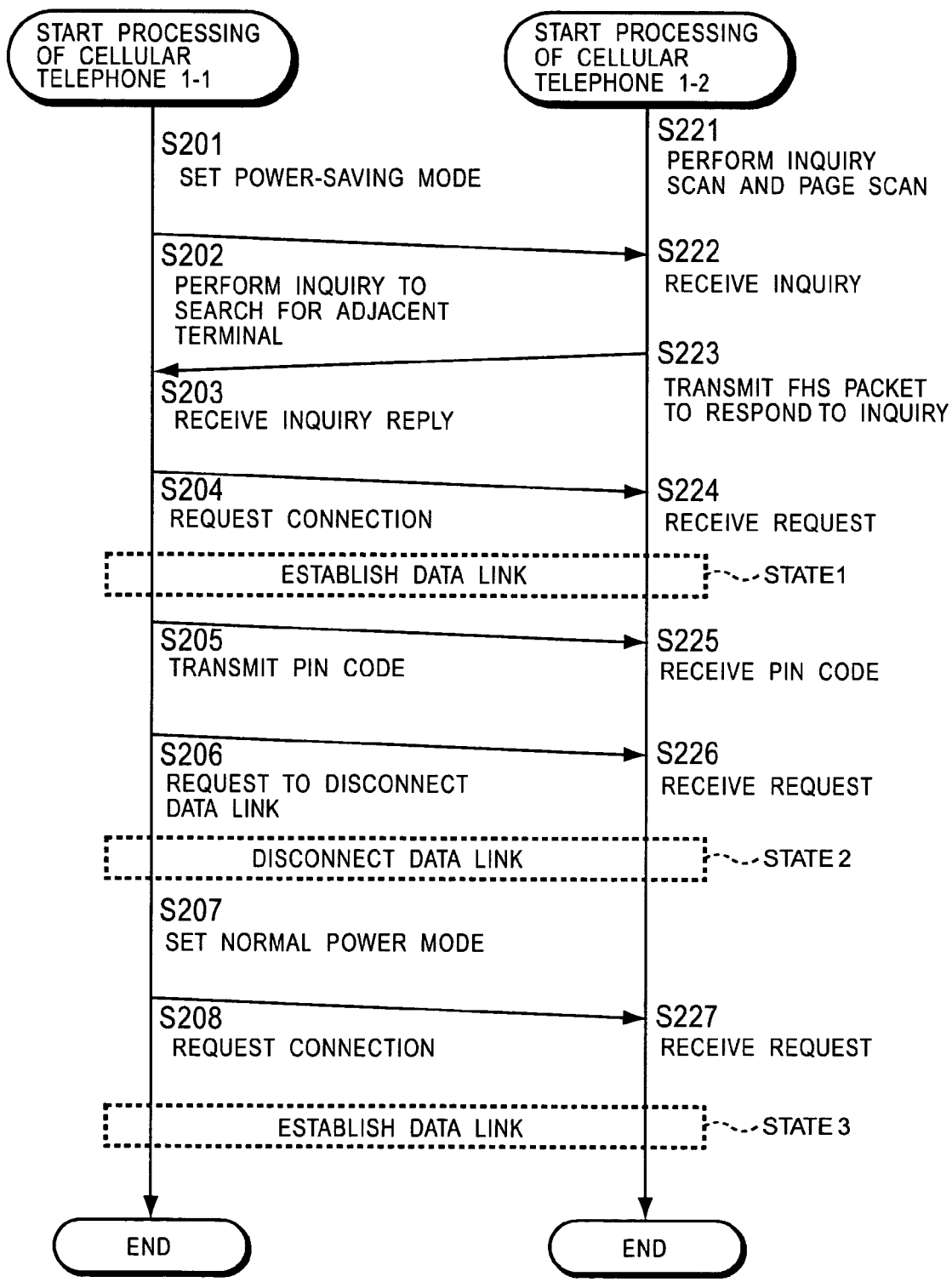

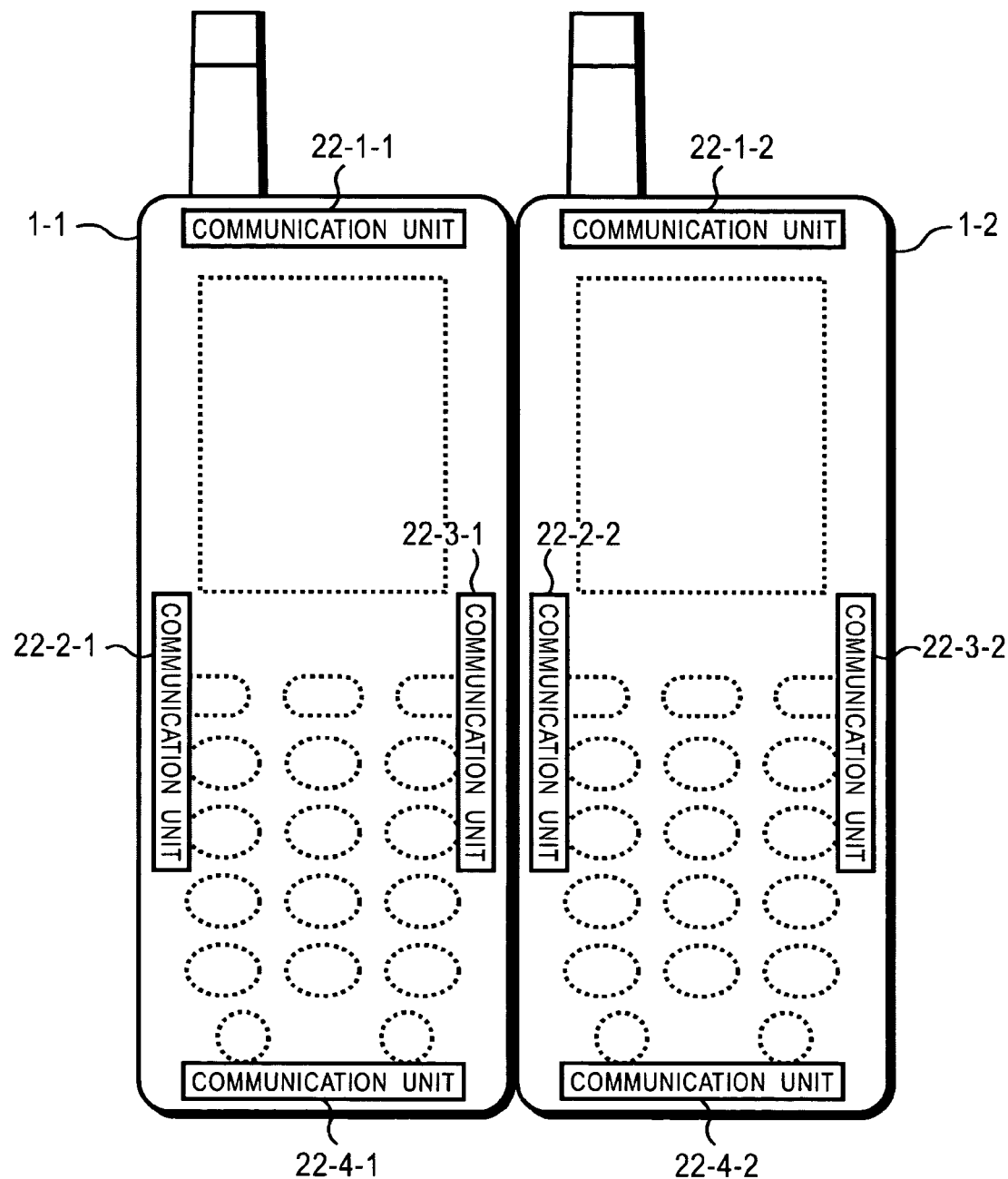

INFORMATION PROCESSING APPARATUS AND METHOD, AND RECORDING MEDIUM

TECHNICAL FIELD

The present invention relates to an information processing apparatus and method, and a recording medium, and particularly to an information processing apparatus and method, and a recording medium which allow a user to know the communication status.

BACKGROUND ART

Recently, the popularity of cellular telephones or PDAs (Personal Digital Assistants) has rapidly increased. As a result, users have increased opportunities to exchange information between such devices.

In the related art, for such information exchange, the devices are connected with each other via a cradle or a cable, or an infrared transmission/reception unit of one device faces that of another device for data transmission/reception.

However, wired connection is not only bothersome but it is also inconvenient since a connector suitable for each type of device must be prepared.

For infrared communication, an obstruction in the infrared transmission path, such as the user carelessly obstructing it, causes the communication to be interrupted.

Accordingly, wireless communication between a plurality of devices using a wireless LAN (Local Area Network) or short-distance wireless communication such as Bluetooth™ has been proposed.

However, in order to transmit desired information, for example, from a cellular telephone of a first user to a cellular telephone of a second user, it cannot be determined whether or not transmission of the information from the cellular telephone of the first user to the cellular telephone of the second user is completed until communication is actually performed therebetween and the transmitted information or data related to the information is displayed and confirmed on the cellular telephone of the second user.

Thus, when information is transmitted wirelessly, a time-consuming operation is required to know whether or not transmission of desired information is completed and the direction of transmission of the information.

DISCLOSURE OF INVENTION

The present invention has been made in view of such a background, and it is an object of the present invention to allow a user to immediately and easily know whether or not transmission of desired data is completed and the direction of transmission of the data.

An information processing apparatus of the present invention includes detecting means for detecting an electronic device which is placed adjacent thereto, and for detecting the direction in which the electronic device is placed; obtaining means for obtaining identification information of the electronic device when the electronic device placed adjacent thereto is detected by the detecting means; communication means for communicating with the electronic device over a network based on the identification information; and display control means for controlling display so that an image corresponding to at least one of the communication status of data communicated over the network and the content of the data is displayed based on the direction in which the electronic device is placed.

The display control means may control display so that the image is displayed in a manner corresponding to reception or transmission of the data.

When the communication of the data is completed, the display control means may control display so that the image is displayed in a manner corresponding to reception or transmission of the data.

The display control means may control display so that, when the data is received, a display area of the image increases from the direction in which the electronic device is placed, and may control display so that, when the data is transmitted, the display area of the image decreases in the direction in which the electronic device is placed.

The display control means may control display so that, when the data is received, the display area of the image increases by adding the received data, and may control display so that, when the data is transmitted, the display area of the image decreases by deleting the transmitted data from the image.

An information processing method of the present invention includes a detection step of detecting an electronic device which is placed adjacent, and detecting the direction in which the electronic device is placed; an obtaining step of obtaining identification information of the electronic device when the electronic device placed adjacent is detected in the detection step; a communication step of communicating with the electronic device over a network based on the identification information; and a display control step of controlling display so that an image corresponding to at least one of the communication status of data communicated over the network and the content of the data is displayed based on the direction in which the electronic device is placed.

A program in a recording medium of the present invention includes a detection step of detecting an electronic device which is placed adjacent thereto, and detecting the direction in which the electronic device is placed; an obtaining step of obtaining identification information of the electronic device when the electronic device placed adjacent thereto is detected in the detection step; a communication step of communicating with the electronic device over a network based on the identification information; and a display control step of controlling display so that an image corresponding to at least one of the communication status of data communicated over the network and the content of the data is displayed based on the direction in which the electronic device is placed.

In an information processing apparatus and method, and a program recorded in a recording medium according to the present invention, an electronic device which is placed adjacent thereto and the direction in which the electronic device is placed are detected; identification information of the electronic device is obtained when the electronic device placed adjacent thereto is detected; communication with the electronic device is performed over a network based on the identification information; and display is controlled so that an image corresponding to at least one of the communication status of data communicated over the network and the content of the data is displayed based on the direction in which the electronic device is placed.

BRIEF DESCRIPTION OF THE DRAWINGS

FIG. 28 is a block diagram showing an example structure of the cellular telephone shown in FIG. 27.

FIG. 29 is a block diagram showing a specific example structure of the communication unit shown in FIG. 28.

FIG. 30 is a flowchart showing a process of the communication system shown in FIG. 27.

FIG. 31 is a diagram illustrating an example of the arrangement of the communication units of the cellular telephone 1-1 and the cellular telephone 1-2.

BEST MODE FOR CARRYING OUT THE INVENTION

Figure 1:
FIG. 1 is a diagram showing an embodiment of a cellular telephone according to the present invention.

FIG. 1 shows an embodiment of a cellular telephone according to the present invention. In this example, a cellular telephone 1-2 is placed in the vicinity of a cellular telephone 1-1 so that predetermined data, such as stored electronic mail, can be exchanged between the cellular telephone 1-1 and the cellular telephone 1-2.

In the cellular telephone 1-1 and the cellular telephone 1-2, an image formed of characters and so on which indicates the content of the exchanged data, the direction of transmission of the data, or the transmission route of the data is displayed on a display screen.

Figure 2:
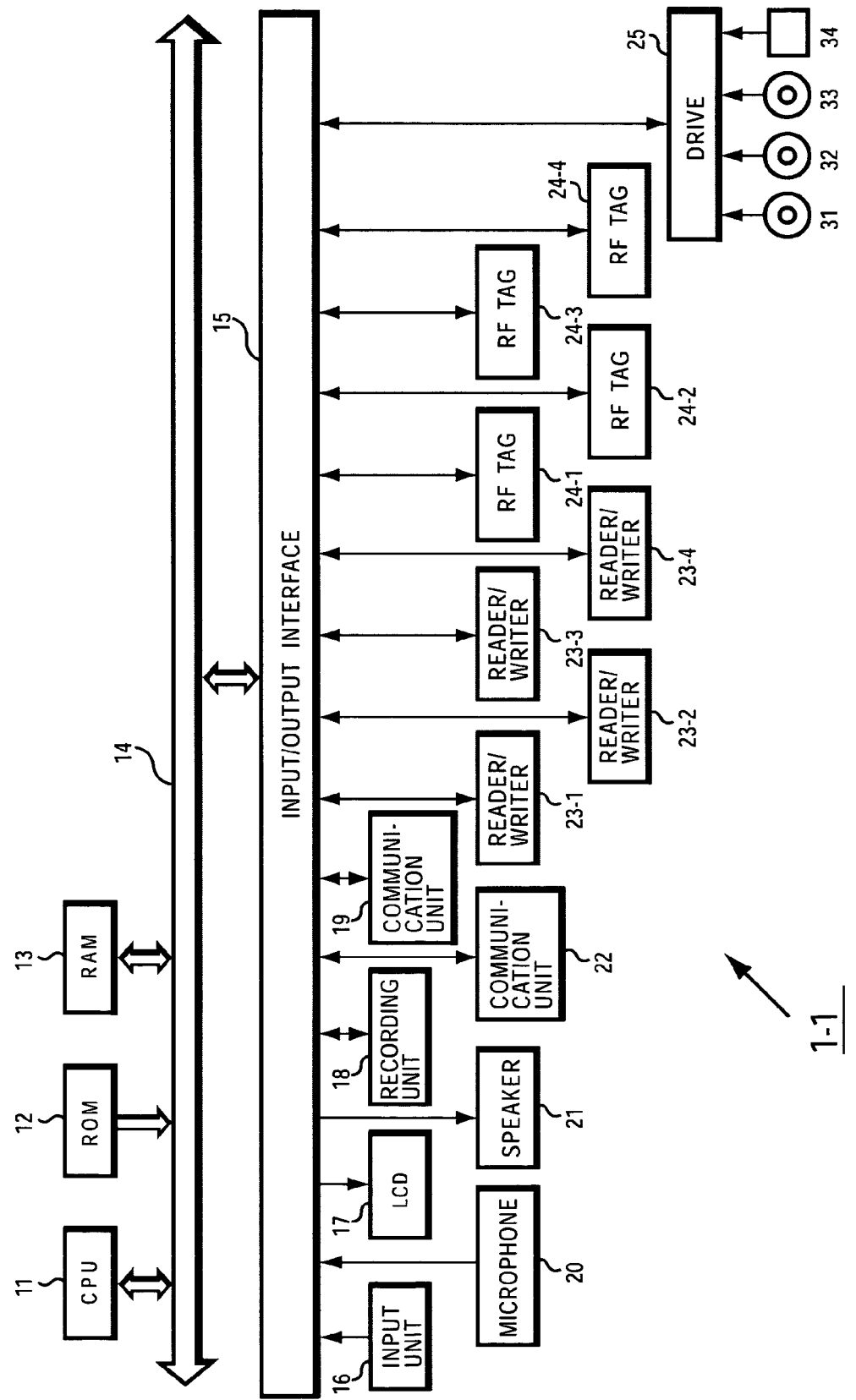
FIG. 2 is a block diagram showing an example structure of a cellular telephone 1-1.

FIG. 2 is a block diagram showing an example structure of the cellular telephone 1-1. A CPU (Central Processing Unit) 11 executes various processes according to programs stored in a ROM (Read Only Memory) 12 or a storage unit 18. A RAM (Random Access Memory) 13 stores a program executed by the CPU 11, data, and so on, as required. The CPU 11, the ROM 12, and the RAM 13 are connected with one another via a bus 14. An input/output interface 15 is also connected with the bus 14.

An input unit 16 constructed of various buttons or switches and an LCD (Liquid Crystal Display) 17 for displaying predetermined information are connected to the input/output interface 15. The storage unit 18 constructed of a semiconductor memory or the like and a communication unit 19 for performing communication over a telephone line are also connected to the input/output interface 15.

A microphone 20 captures the user's voice, and a speaker 21 outputs a voice to the user.

A communication unit 22 is a so-called Bluetooth module. The communication unit 22 forms a piconet together with, for example, a Bluetooth module of the cellular telephone 1-2, and transmits and receives various data according to instructions from the CPU 11.

Bluetooth is a wireless communication standard established by the Bluetooth SIG (Special Interest Group), which allows communication between devices incorporating a Bluetooth module (hereinafter referred to as Bluetooth devices, as required) using the 2.4 GHz band (ISM (Industrial Science Medical) band).

A Bluetooth-based network is referred to as a piconet or a scatternet in which a plurality of piconets are connected with one another, depending upon the network type, in which Bluetooth devices acting as a so-called master and slave are present. A Bluetooth device acting as the master and a Bluetooth device acting as the slave are hereinafter referred to simply as a master and a slave, respectively.

In order to form a piconet in which various information is transmitted and received, all Bluetooth devices in the piconet must be synchronized in frequency and time.

The synchronization in frequency and the synchronization in time are briefly described below.

In Bluetooth, for example, a signal is transmitted from the master to a slave using a spectrum of 79 MHz. In this case, the master does not concurrently occupy the 79 MHz spectrum for transmission of information, but changes (hops) the transmission frequency of the information at random by a spectrum of 1 MHz for transmission.

The slave on the receiving side is synchronized to the transmission frequency of the master which changes at random to appropriately change the reception frequency for reception of the information transmitted from the master.

The pattern of the frequency changed by the master and the slave is referred to as a frequency hopping pattern, and when the frequency hopping pattern is shared between the master and the slave, this corresponds to synchronization in frequency.

In Bluetooth, furthermore, the master and a plurality of slaves participate in communication, and the communication path (channel) between the master and each of the slaves is time-division multiplexed in units of 625 μs. The time interval of 625 μs is referred to as a time slot, and when the time slot is shared, this corresponds to synchronization in time.

It is noted that all slaves determine the frequency hopping pattern based on the Bluetooth address of the master to set up synchronization in frequency, and apply an offset to the Bluetooth clocks managed by themselves based on the Bluetooth clock of the master to determine the timing of the time slot to set up synchronization in time.

A Bluetooth address is a 48-bit address unique to each Bluetooth device, based on which the frequency hopping pattern is uniquely determined. A Bluetooth clock is managed by all Bluetooth devices.

Before forming a piconet, therefore, various information, including a Bluetooth address and Bluetooth clock for setting up synchronization in frequency and time, is exchanged between the master and the slaves.

Readers/writers 23-1 through 23-4 which communicate with RF tags of the cellular telephone 1-2 are also connected with the input/output interface 15. The readers/writers 23-1 through 23-4 receive identification information of the cellular telephone 1-2, such as a Bluetooth device name, which is transmitted from the RF tags of the cellular telephone 1-2.

RF tags 24-1 through 24-4 are also connected with the input/output interface 15. The RF tags 24-1 through 24-4 each having an internal IC communicate with readers/writers of the cellular telephone 1-2 to transmit a Bluetooth device name of the cellular telephone 1-1 and so on which are stored therein to the readers/writers of the cellular telephone 1-2. The RF tags 24-1 through 24-4 also have a function to store data supplied from the readers/writers of the cellular telephone 1-2 into internal memories.

Figure 3:
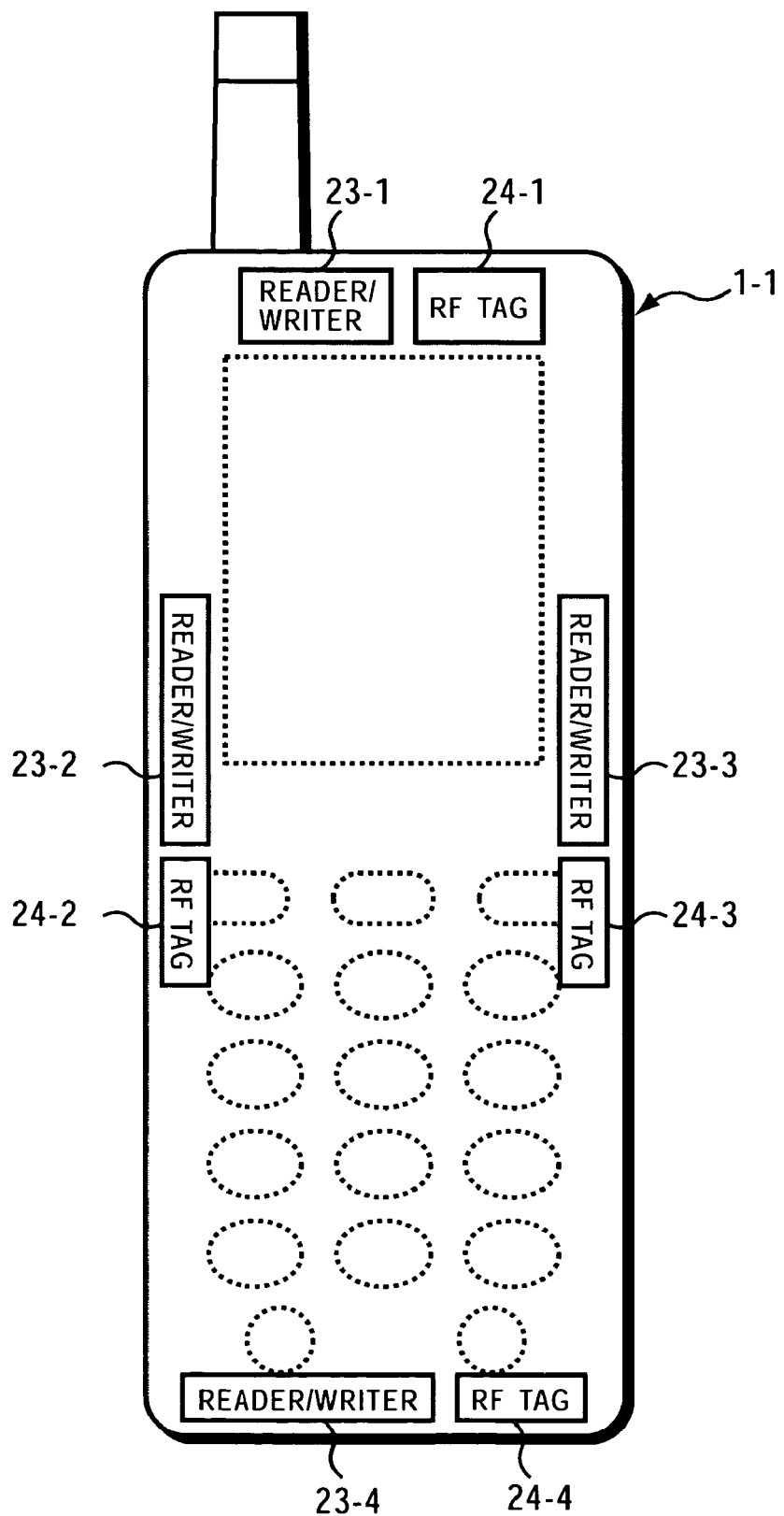
FIG. 3 is a diagram showing the arrangement of readers/writers 23-1 through 23-4 and RF tags 24-1 through 24-4.

FIG. 3 is a diagram showing the arrangement of the readers/writers 23-1 through 23-4 and the RF tags 24-1 through 24-4 of the cellular telephone 1.

The reader/writer 23-1 and the RF tag 24-1 are arranged in, for example, the upper portion of the cellular telephone 1-1. The reader/writer 23-2 and the RF tag 24-2 are arranged in, for example, the left portion of cellular telephone 1-1.

The reader/writer 23-3 and the RF tag 24-3 are arranged in, for example, the right portion of the cellular telephone 1-1. The reader/writer 23-4 and the RF tag 24-4 are arranged in, for example, the lower portion of the cellular telephone 1-1.

Each of the readers/writers 23-1 through 23-4 and each of the RF tags 24-1 through 24-4 are electromagnetically insulated from each other such as by providing a magnetic shielding plate therebetween.

The readers/writers 23-1 through 23-4 are hereinafter referred to simply as a reader/writer 23 if it is not necessary to individually identify them.

The RF tags 24-1 through 24-4 are hereinafter referred to simply as an RF tag 24 if it is not necessary to individually identify them.

A drive 25 is further connected to the input/output interface 15 in an attachable/detachable manner, and a magnetic disc 31, an optical disc 32, a magneto-optical disc 33, a semiconductor memory 34, or the like may be attached to the drive 25, as required. A program read from these devices, i.e., the magnetic disc 31 till the semiconductor memory 34, is supplied from the drive 25 to the storage unit 18 via the input/output interface 15.

Figure 4:
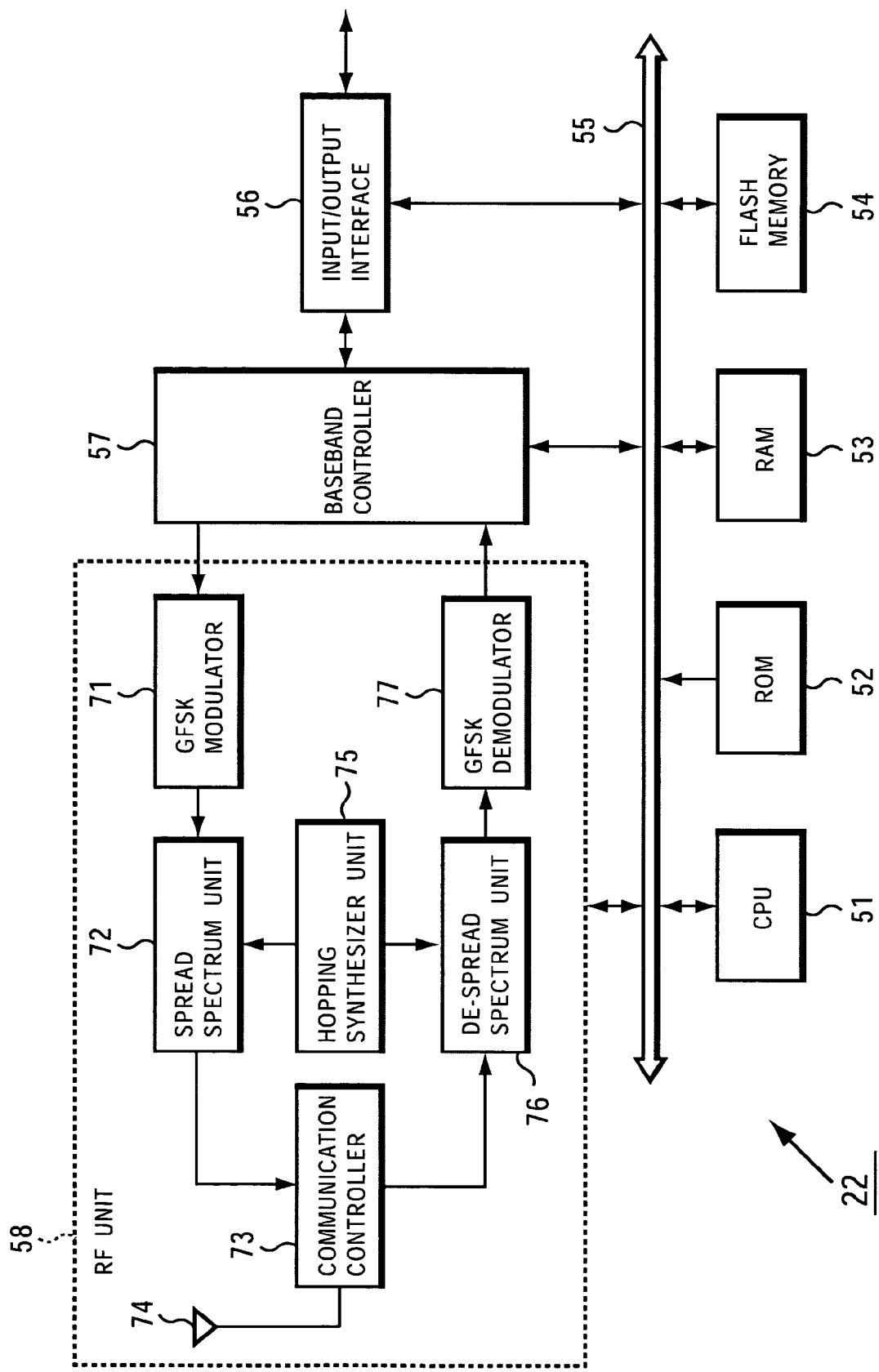
FIG. 4 is a block diagram showing a specific example structure of a communication unit 22.

FIG. 4 is a block diagram showing a specific example structure of the communication unit 22 which is a Bluetooth module.

A CPU 51 extends a control program stored in a ROM 52 to a RAM 53 to control the overall operation of the communication unit 22. These components, i.e., the CPU 51 till the RAM 53, are connected with one another via a bus 55, and a flash memory 54 is also connected to the bus 55.

The flash memory 54 stores, for example, a Bluetooth device name which is allocated to each Bluetooth device and which can be appropriately modified by a user, a Bluetooth address unique to each Bluetooth device, and so on.

A Bluetooth address is a 48-bit identifier specific (unique) to each Bluetooth device, and is therefore used for various processes related to management of the Bluetooth device.

As discussed above, for example, it is necessary for all slaves to obtain information on the frequency hopping pattern of the master in order to set up synchronization in a piconet, and the frequency hopping pattern is determined by the slaves based on the Bluetooth address of the master.

More specifically, the Bluetooth address is sectioned into an LAP (Low Address Part) of the 24 least-significant-bits, a UAP (Upper Address Part) of the next 8 bits, and an NAP (Non-significant Address Part) of the remaining 16 bits, and 28 bits consisting of all 24 bits of the LAP and lower 4 bits of the UAP are used for determination of the frequency hopping pattern.

Each of the slaves is able to determine the frequency hopping pattern based on the above-noted 28-bit portion of the Bluetooth address of the master and the Bluetooth clock informed by the master which are obtained during paging for setting up synchronization in the piconet.

In the frequency hopping pattern, there are defined an inquiry frequency hopping pattern for use during an inquiry, a page frequency hopping pattern for use during paging, and a channel frequency hopping pattern for use during communication between slaves and the master after synchronization setup in a piconet. The three frequency hopping patterns are hereinafter referred to simply as a frequency hopping pattern if it is not necessary to individually identify them.

The flash memory 54 also stores a link key and so on used for authenticating the Bluetooth device of the other communication party, or for encoding data to be transmitted, after synchronization setup in a piconet, and supplies the stored link key and so on to the CPU 51, if necessary.

The input/output interface 56 manages an input/output of the data supplied from the CPU 11 shown in FIG. 2 and the data supplied from a baseband controller 57 according to instructions from the CPU 51.

The baseband controller 57 supplies the data supplied from the input/output interface 56 to a GFSK (Gaussian Frequency Shift Keying) modulator 71 for transmission to the cellular telephone 1-2, and outputs the data supplied from a GFSK demodulator 77 to the bus 55 or the input/output interface 56.

The GFSK modulator 71 filters and limits a high-frequency component of the data supplied from the baseband controller 57, which is then subjected to frequency modulation as the primary modulation, and outputs the resulting data to a spread spectrum unit 72.

The spread spectrum unit 72 switches the carrier frequency based on the frequency hopping pattern which is determined in the above-discussed way and which is informed by a hopping synthesizer unit 75, and spreads the supplied data to output the resulting spread spectrum signal to a communication controller 73. In Bluetooth, the spread spectrum unit 72 is adapted to transmit data with the frequency hopping at 625 μs intervals.

The communication controller 73 transmits the spread spectrum signal from an antenna 74 using the 2.4 GHz band. The communication controller 73 also outputs a signal received from the antenna 74 to a de-spread spectrum unit 76.

The de-spread spectrum unit 76 causes the reception frequency to hop based on the frequency hopping pattern informed by the hopping synthesizer unit 75 to obtain the signal, for example, from the cellular telephone 1-2. The de-spread spectrum unit 76 de-spreads the obtained signal to reproduce the signal from the cellular telephone 1-2, and outputs the resulting signal to the GFSK demodulator 77. The GFSK demodulator 77 GFSK demodulates the signal supplied from the de-spread spectrum unit 76, and outputs the resulting data to the baseband controller 57.

Figure 5:
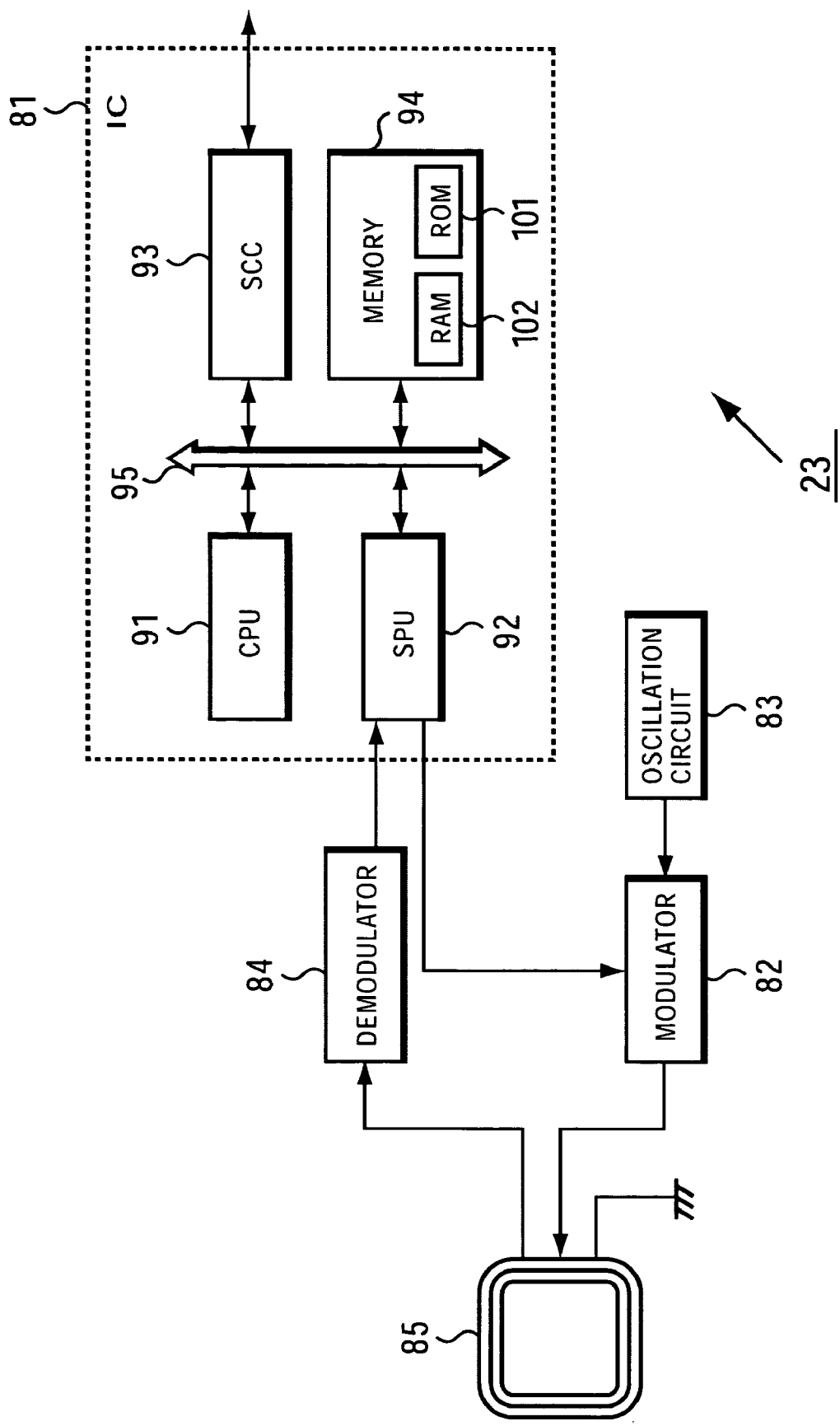
FIG. 5 is a block diagram showing a specific example structure of a reader/writer 33.

FIG. 5 is a block diagram showing a specific example structure of the reader/writer 23.

An IC 81 is constructed of a CPU 91, an SPU (Signal Processing Unit) 92, an SCC (Serial Communication Controller) 93, and a memory 94, and the memory 94 is constructed of a ROM 101 and a RAM 102. The above-noted units, i.e., the CPU 91 till the memory 94, are connected with one another via a bus 95.

The CPU 91 extends a control program stored in the ROM 101 to the RAM 102, and executes various processes based on reply data transmitted from the RF tags of the cellular telephone 1-2 or a control signal supplied from the CPU 11 shown in FIG. 2. For example, the CPU 91 generates a command which is transmitted to the RF tags of the cellular telephone 1-2, and outputs the command to the SPU 92 via the bus 95 or authenticates the data transmitted from the RF tags of the cellular telephone 1-2.

When the cellular telephone 1-2 is placed adjacent thereto and when a Bluetooth device name is informed by processing of components described below, the CPU 91 informs it of the communication unit 22 according to an instruction of the CPU 11.

When reply data from the RF tags of the cellular telephone 1-2 is supplied from a demodulator 84, for example, the SPU 92 BPSK (Binary Phase Shift Keying) demodulates the reply data, and supplies the resulting data to the CPU 91. When a command to be transmitted to the RF tags of the cellular telephone 1-2 is supplied via the bus 95, the SPU 92 performs a modulation process (the primary modulation) on the command, and outputs the resulting data to a modulator 82.

The SCC 93 supplies the data supplied from the CPU 11 to the CPU 91 via the bus 95, or outputs the data supplied from the CPU 91 via the bus 95 to the CPU 11.

The modulator 82 performs ASK (Amplitude Shift Keying) modulation, as the secondary modulation, on a carrier wave having a predetermined frequency which is supplied from an oscillation circuit (OSC) 83 based on the data supplied from the SPU 92, and outputs the produced modulation wave from the antenna 85 as an electromagnetic wave. Meanwhile, the demodulator 84 demodulates the modulation wave (ASK modulated wave) obtained via the antenna 85, and outputs the demodulated data to the SPU 92.

The antenna 85 radiates predetermined electromagnetic waves, and determines whether or not the RF tags of the cellular telephone 1-2 are adjacent thereto based on a change of load thereon. If the RF tags of the cellular telephone 1-2 are adjacent thereto, the antenna 85 transmits and receives various data to and from the RF tags of the cellular telephone 1-2.

Figure 6:
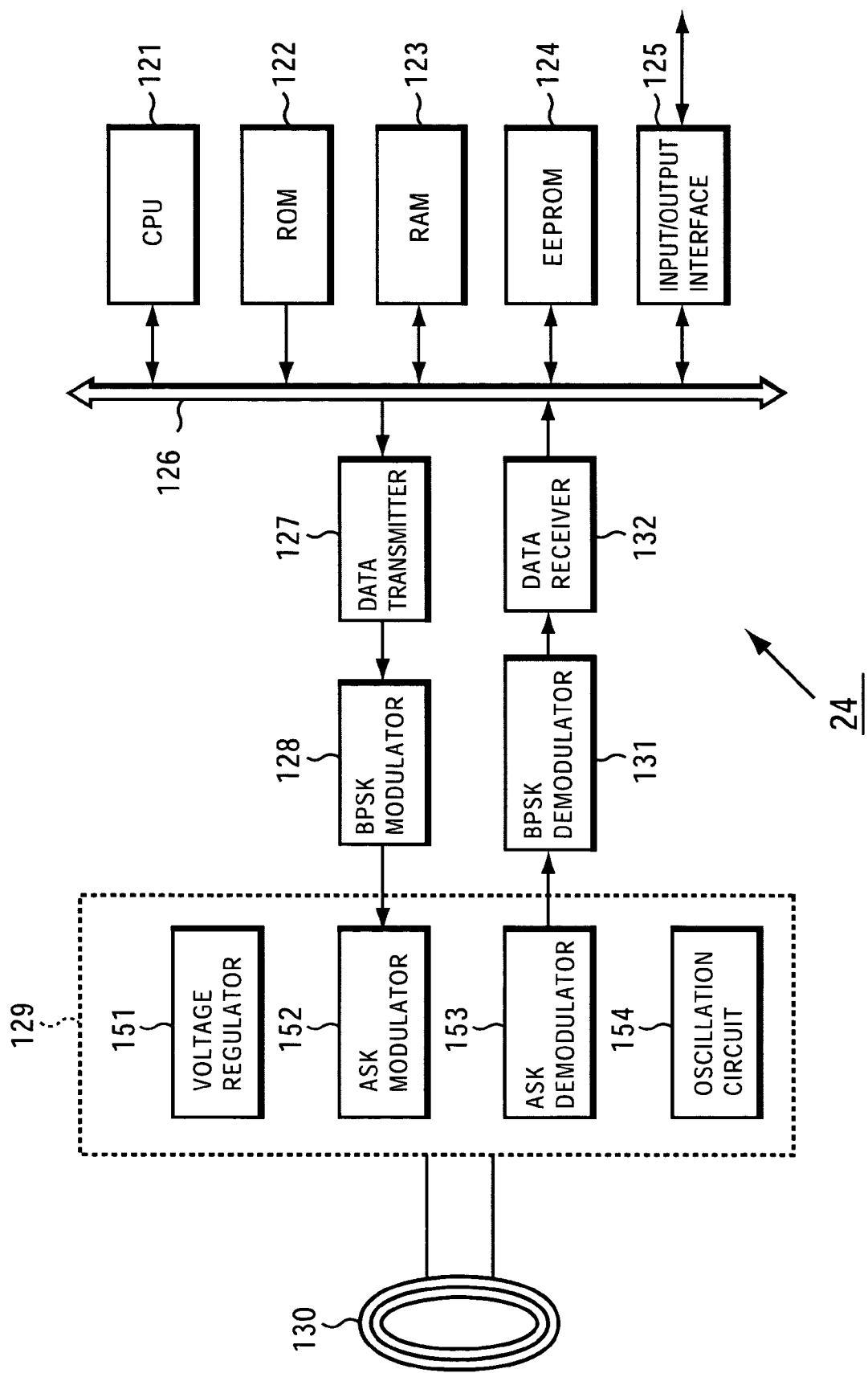
FIG. 6 is a block diagram showing a specific example structure of the RF tag 24.

FIG. 6 is a block diagram showing a specific example structure of the RF tag 24.

The RF tag 24 is constructed of, for example, an antenna 130 shown in the figure, and an IC incorporating components other than the antenna 130 into one chip. A basically similar function to that of the RF tag 24 is provided by, for example, Felica (registered trademark).

A CPU 121 extends a control program stored in a ROM 122 to a RAM 133 to control the overall operation of the RF tag 24. For example, when electromagnetic waves radiated from the reader/writer of the cellular telephone 1-2 are received by the antenna 130, the CPU 121 correspondingly sends the identification information set in the RF tag 24 to the reader/writer of the cellular telephone 1-2.

The identification information may be modified as desired. For example, the identification information may be the same as the Bluetooth device name set in the communication unit 22 which is a Bluetooth module, or may include the Bluetooth device name.

In FIG. 6, a data transmitter 127, a BPSK modulator 128, a BPSK demodulator 131, and a data receiver 132 correspond to the SPU 92 of the reader/writer 23 shown in FIG. 5, and an ASK modulator 152 and an ASK demodulator 153 correspond to the modulator 82 and the demodulator 84, respectively. The basic processing of these components is similar to that discussed above, and a detailed description thereof is thus omitted.

For example, when the cellular telephone 1-1 is placed in the vicinity of the cellular telephone 1-2, the identification information is read from an EEPROM 124, and is then output to the data transmitter 127. The identification information supplied to the data transmitter 127 is subjected to BPSK modulation as the primary modulation in the BPSK modulator 128, and the result is output to the ASK modulator 152.

The ASK modulator 152 turns on/off, for example, a predetermined switching device according to the data supplied from the BPSK modulator 128 to change the load placed on the antenna 130, and ASK modulates a modulation wave from the reader/writer of the cellular telephone 1-2 received by the antenna 130, so that a modulation component thereof is transmitted to the reader/writer of the cellular telephone 1-2 (a terminal voltage of the antenna 85 of the reader/writer 23 is changed).

The RF tag 24 not only sends the identification information to the cellular telephone 1-2, but, for example, also performs various processes such as authentication between the reader/writer 23 and the RF tag 24 and encoding of data to be transmitted.

In foregoing description, the reader/writer 23 of the cellular telephone 1-1 communicates with the RF tag of the cellular telephone 1-2 and the RF tag 24 of the cellular telephone 1-2 communicates with the reader/writer of the cellular telephone 1-2. When the reader/writer 23 of the cellular telephone 1-1 communicates with the RF tag of the cellular telephone 1-2, the RF tag 24 of the cellular telephone 1-2 suspends communication with the reader/writer of the cellular telephone 1-2, and when the RF tag 24 of the cellular telephone 1-2 communicates with the reader/writer of the cellular telephone 1-2, the reader/writer 23 of the cellular telephone 1-1 suspends communication with the RF tag of the cellular telephone 1-2.

In other words, either a set of the reader/writer 23 of the cellular telephone 1-1 and the RF tag of the cellular telephone 1-2 or a set of the RF tag 24 of the cellular telephone 1-2 and the reader/writer of the cellular telephone 1-2 performs communication.

Figure 7:
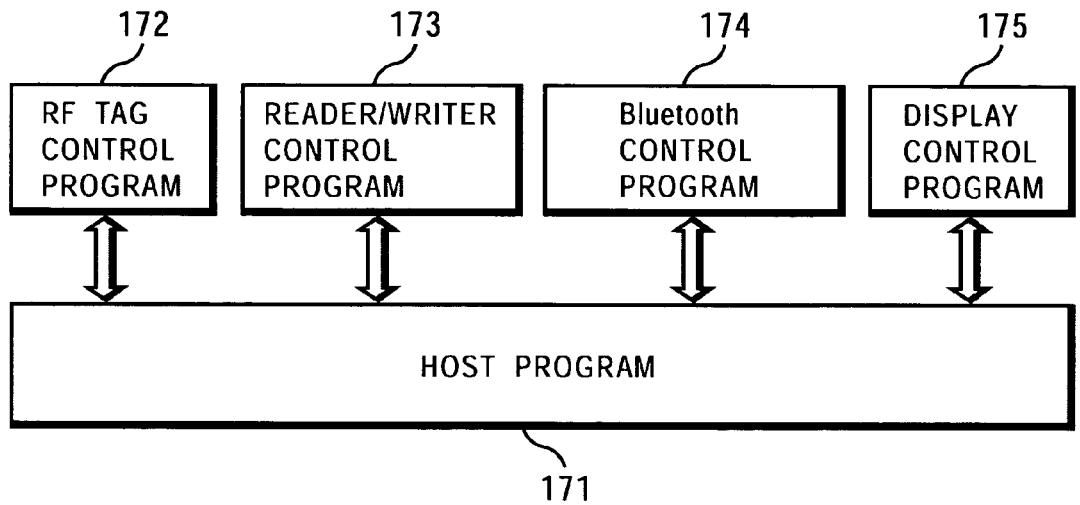
FIG. 7 is a diagram showing an example of functional blocks of the cellular telephone 1-1.

FIG. 7 is a diagram showing an example of function blocks of the cellular telephone 1-1.

A host program 171 provides basic functions of the cellular telephone 1-1, including, for example, a dial function and an electronic mail transmission/reception function. An RF tag control program 172 controls the operation of the RF tag 24, and performs various processes according to instructions of the host program 171.

For example, when the cellular telephone 1-1 is placed in the vicinity of the cellular telephone 1-2, the RF tag control program 172 causes the RF tag 24 to supply the identification information set therein to the reader/writer of the cellular telephone 1-2 or activates the communication unit 22 (a Bluetooth control program 174), which is a Bluetooth module, upon reception of electromagnetic waves from the reader/writer of the cellular telephone 1-2.

A reader/writer control program 173 controls the reader/writer 23 to detect the presence of the adjacent cellular telephone 1-2 having the built-in RF tags or to transmit/receive various information to/from the RF tags of the cellular telephone 1-2 via electromagnetic waves.

A Bluetooth control program 174 controls the communication unit 22 to, for example, detect an adjacent Bluetooth device or to establish synchronization for communication with that Bluetooth device.

A display control program 175 controls the display of an image such as a character or an illustration on the LCD 17.

The cellular telephone 1-2 has a similar structure to that of the cellular telephone 1-1, a detailed description thereof is thus omitted. In the following description, for example, the CPU of the cellular telephone 1-1 is designated by a CPU 11-1, and the CPU of the cellular telephone 1-2 is designated by a CPU 11-2, if necessary. Other components are described below in a similar manner.

If it is not necessary to individually identify the cellular telephone 1-1 and the cellular telephone 1-2, these are hereinafter referred to simply as a cellular telephone 1.

A display corresponding to communication between the cellular telephone 1-1 and the cellular telephone 1-2 is described below with reference to FIGS. 8 through 20.

FIGS. 8 through 12 are diagrams illustrating communication between the cellular telephone 1-1 and the cellular telephone 1-2 and a display corresponding to the communication when the right side of the cellular telephone 1-1 is adjacent to the left side of the cellular telephone 1-2.

More specifically, the cellular telephone 1-1 transmits an electronic mail containing "ABCDEFGHIJ . . . ", which is displayed on the LCD 17-1 in the manner shown in FIG. 8, to the cellular telephone 1-2, by way of example.

Figure 8:
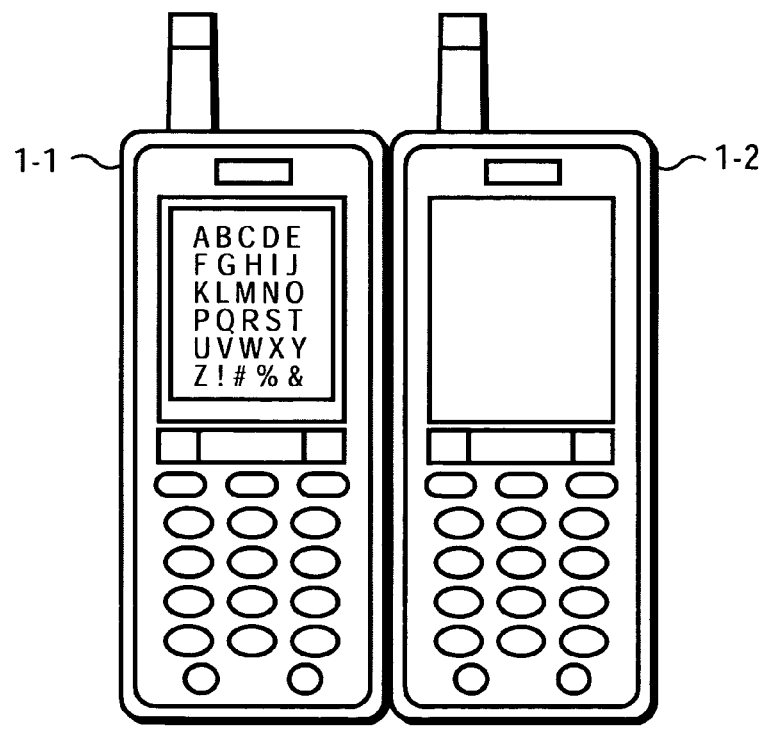
FIG. 8 is a diagram illustrating a display example corresponding to communication between the cellular telephone 1-1 and a cellular telephone 1-2.
Figure 9:
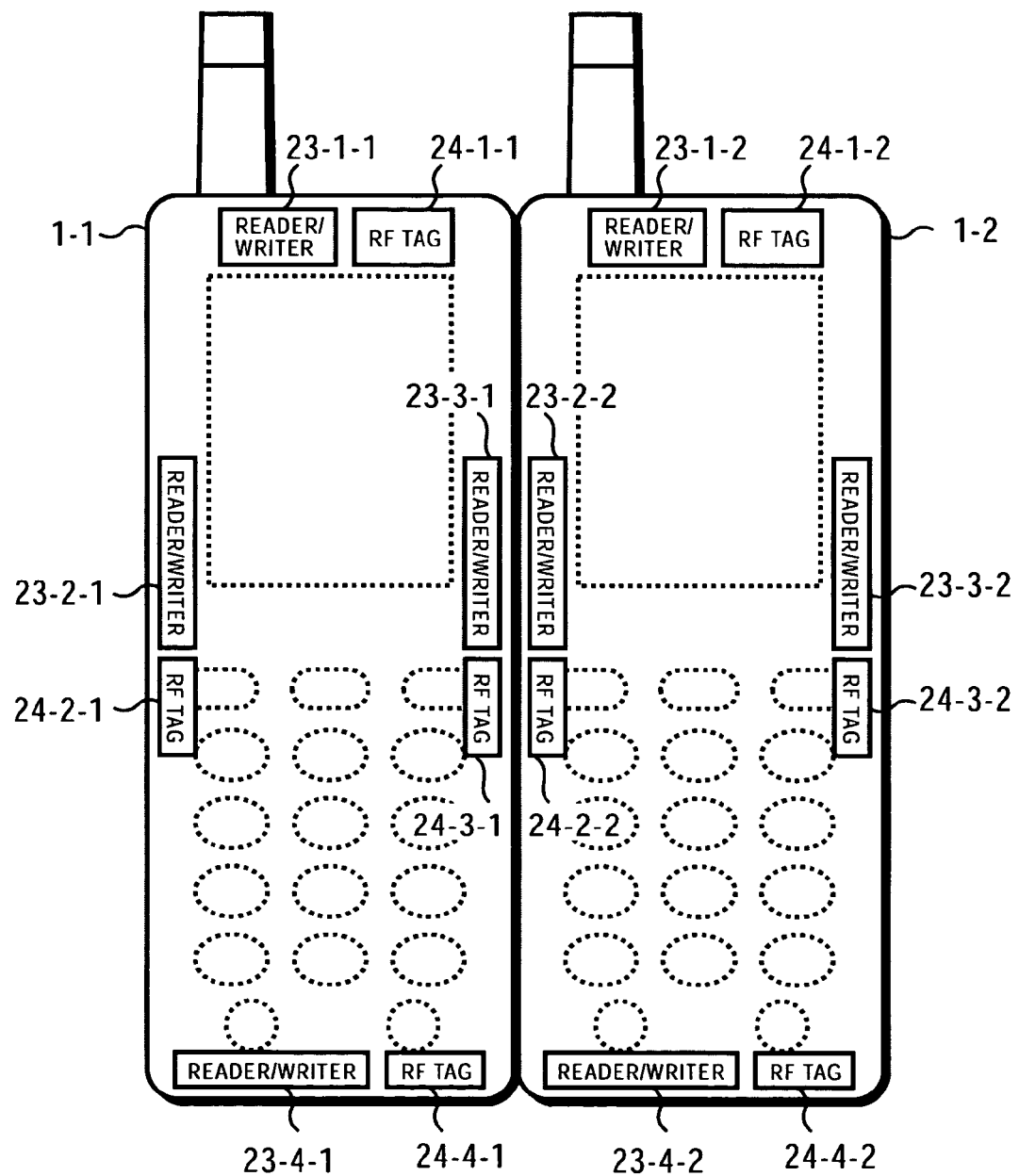
FIG. 9 is a diagram illustrating correspondence of the reader/writer 23 and the RF tag 24 which communicate with each other.

When the right side of the cellular telephone 1-1 is adjacent to the left side of the cellular telephone 1-2 in the manner shown in FIG. 8, as shown in FIG. 9, the reader/writer 23-3-1 of the cellular telephone 1-1 and the RF tag 24-2-2 of the cellular telephone 1-2 communicate with each other, or the reader/writer 23-2-2 of the cellular telephone 1-2 and the RF tag 24-3-1 of the cellular telephone 1-1 communicate with each other.

For example, the reader/writer 23-3-1 of the cellular telephone 1-1 periodically transmits electromagnetic waves at sufficiently short intervals. When the RF tag 24-2-2 of the adjacent cellular telephone 1-2 is placed adjacent thereto, the reader/writer 23-3-1 and the RF tag 24-2-2 are electromagnetically coupled to each other, thereby changing the equivalent impedance of the antenna 85 built in the reader/writer 23-3-1. Under the control of the reader/writer control program 173-1, the reader/writer 23-31 monitors the change in impedance to determine whether or not the cellular telephone 1-2 is adjacent thereto.

The reader/writer 23-3-1 of the cellular telephone 1-1 issues a request for the device name of the communication unit 22-2, which is a Bluetooth device, to the RF tag 24-2-2 of the adjacent cellular telephone 1-2.

The RF tag 24-2-2 of the cellular telephone 1-2 transmits the device name of the communication unit 22-2 to the reader/writer 23-3-1 of the cellular telephone 1-1 in response to the request from the reader/writer 23-3-1 of the cellular telephone 1-1.

When receiving the device name of the communication unit 22-2 from the RF tag 24-2-2 of the cellular telephone 1-2, the reader/writer 23-3-1 of the cellular telephone 1-1 supplies the device name to the communication unit 22-1.

The communication unit 22-1 of the cellular telephone 1-1 sets up a connection with the communication unit 22-2 of the cellular telephone 1-2 based on the device name of the communication unit 22-2 supplied from the RF tag 24-2-2 of the cellular telephone 1-2 to establish a communication link therewith.

The cellular telephone 1-1 transmits the electronic mail containing "ABCDEFGHIJ . . . " to the cellular telephone 1-2 over the established communication link.

Figure 10:
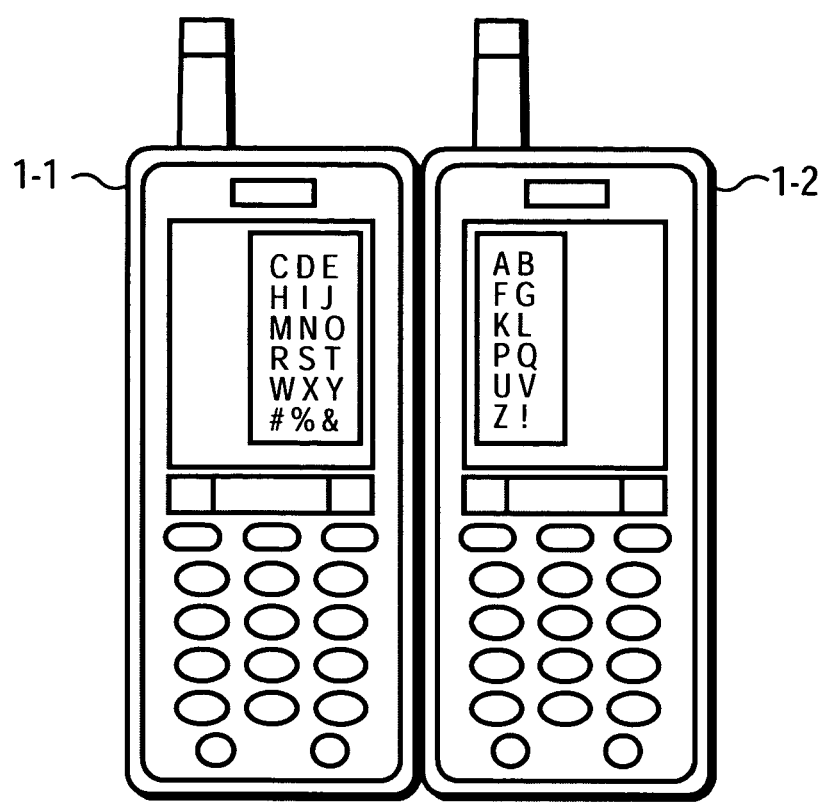
FIG. 10 is a diagram illustrating the display example corresponding to communication between the cellular telephone 1-1 and the cellular telephone 1-2.
Figure 11:
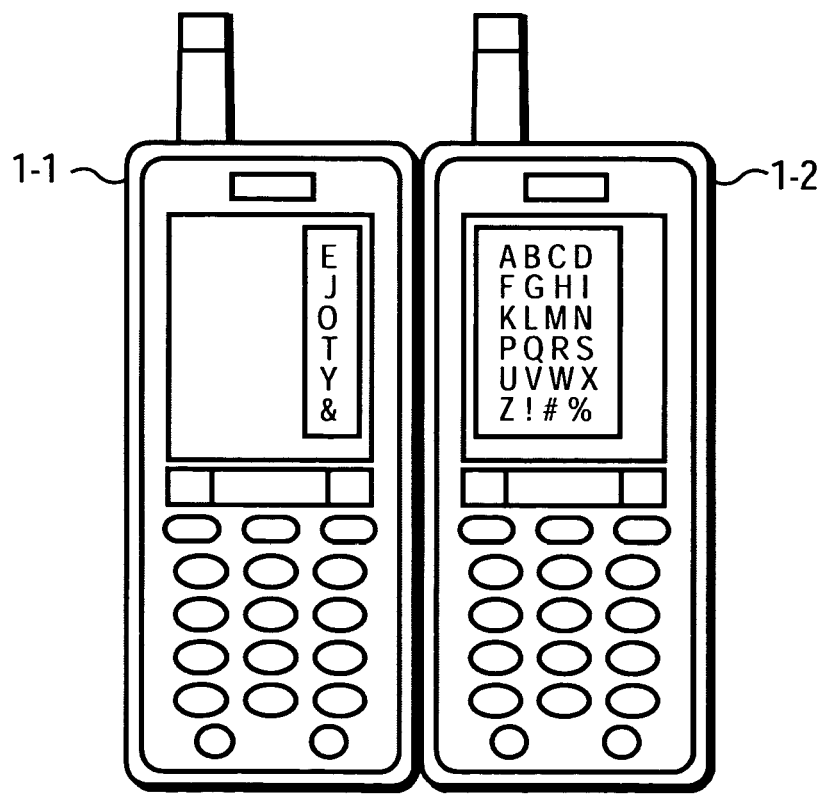
FIG. 11 is a diagram illustrating the display example corresponding to communication between the cellular telephone 1-1 and the cellular telephone 1-2.
Figure 12:
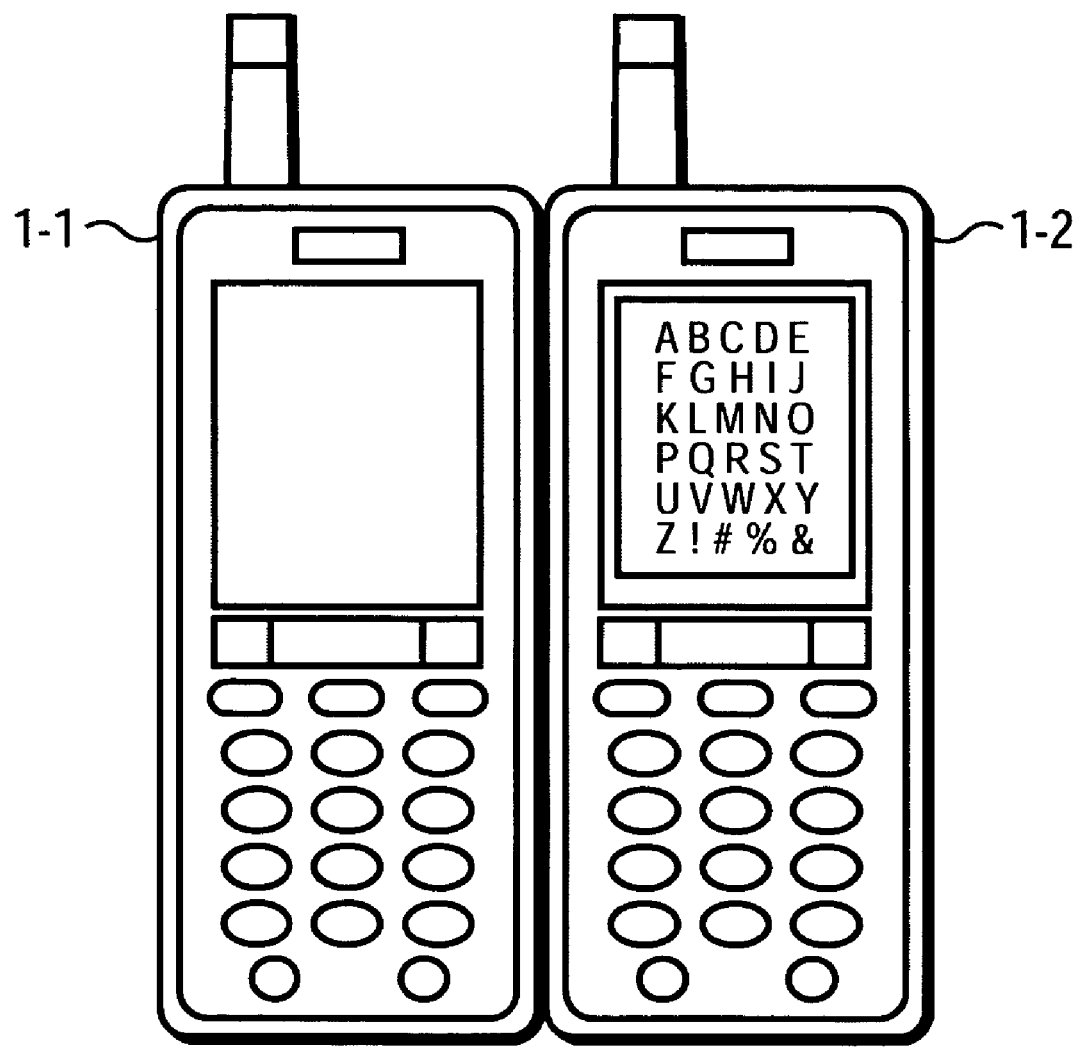
FIG. 12 is a diagram illustrating the display example corresponding to communication between the cellular telephone 1-1 and the cellular telephone 1-2.

As shown in FIGS. 10 through 12, the cellular telephone 1-1 sequentially updates the displayed electronic mail in such a manner that the number of characters of the electronic mail decreases, based on the position of the communicating reader/writer 23-3-1, toward the reader/writer 23-3-1. In other words, the displayed electronic mail is sequentially updated in such a manner that the number of characters in the electronic mail decreases based on the center of the cellular telephone 1-1 and the direction of the reader/writer 23-3-1.

As shown in FIGS. 10 through 12, the cellular telephone 1-2 sequentially displays the electronic mail in such a manner that the number of characters in the electronic mail increases, based on the position of the communicating RF tag 24-2-2, from the side of the RF tag 24-2-2. In other words, the electronic mail is sequentially displayed in such a manner that the number of characters in the electronic mail increases based on the center of the cellular telephone 1-2 and the direction of the RF tag 24-2-2.

For example, as shown in FIG. 10, the cellular telephone 1-1 updates the displayed electronic mail in such a manner that the first and second characters in each row of the displayed electronic mail are sequentially deleted. That is, in the cellular telephone 1-1, an electronic mail in which the first and second characters in each row are deleted in turn and "CDE", "HIJ", "MNO", and so on remain in the first row, the second row, the third row, and so on, respectively, is displayed on the right portion of the LCD 17-1.

As shown in FIG. 10, the cellular telephone 1-2 displays the electronic mail in such a manner that the first and second characters in each row of the electronic mail are sequentially displayed. That is, in the cellular telephone 1-2, an electronic mail in which "AB", "FG", "KL", and so on are present in the first row, the second row, the third row, and so on, respectively, is displayed on the left portion of the LCD 17-2.

Then, as shown in FIG. 11, the cellular telephone 1-1 updates the displayed electronic mail in such a manner that the third and fourth characters in each row of the displayed electronic mail are further deleted sequentially. That is, in the cellular telephone 1-1, an electronic mail in which the third and fourth characters in each row are further deleted and "E", "J", "O", and so on remain in the first row, the second row, the third row, and so on, respectively, is displayed on the right portion of the LCD 17-1.

As shown in FIG. 11, the cellular telephone 1-2 displays the electronic mail in such a manner that the third and fourth characters in each row of the electronic mail are further displayed sequentially. That is, in the cellular telephone 1-2, an electronic mail in which "ABCD", "FGHI", "KLMN", and so on are present in the first row, the second row, the third row, and so on, respectively, is displayed on the left portion of the LCD 17-2.

Then, as shown in FIG. 12, in the cellular telephone 1-1, the fifth character in each row of the displayed electronic mail is deleted, so that the whole electronic mail is deleted.

As shown in FIG. 12, in the cellular telephone 1-2, the fifth character in each row of the electronic mail is further displayed, so that the whole electronic mail is displayed.

Thus, the user is able to know that the electronic mail has been transmitted from the cellular telephone 1-1 to the cellular telephone 1-2, and is also able to know that transmission of the electronic mail is completed.

FIGS. 13 through 17 are diagrams illustrating communication between the cellular telephone 1-1 and the cellular telephone 1-2 and a display corresponding to the communication when the top side of the cellular telephone 1-1 is adjacent to the top side of the cellular telephone 1-2.

More specifically, the cellular telephone. 1-1 transmits an electronic mail containing "ABCDEFGHIJ . . . ", which is displayed on the LCD 17 in the manner shown in FIG. 13, to the cellular telephone 1-2, by way of example.

Figure 13:
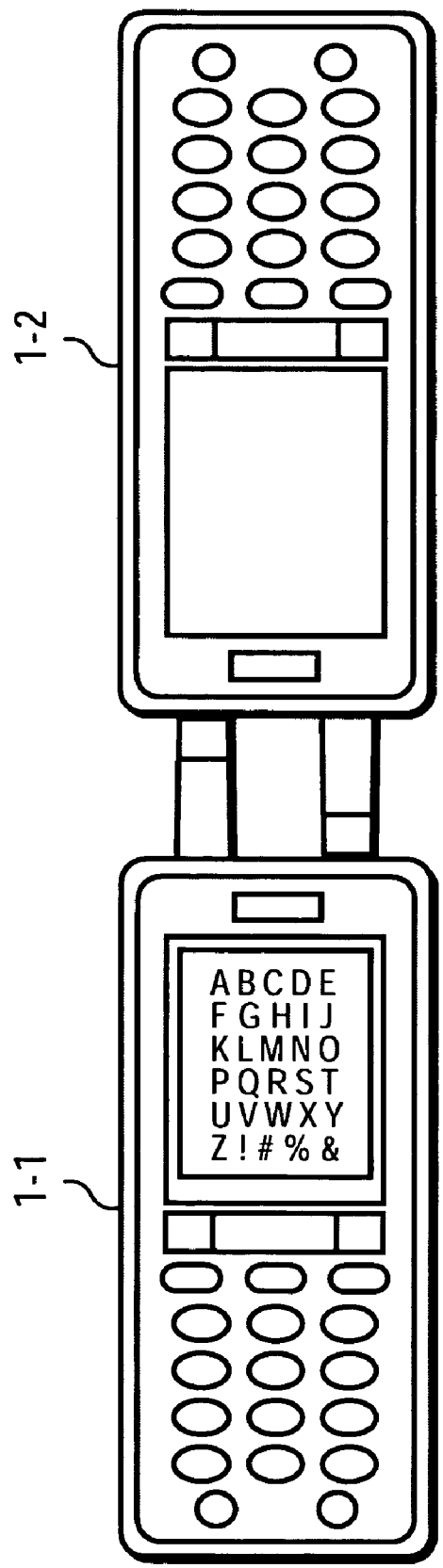
FIG. 13 is a diagram illustrating a display example corresponding to communication between the cellular telephone 1-1 and the cellular telephone 1-2.
Figure 14:
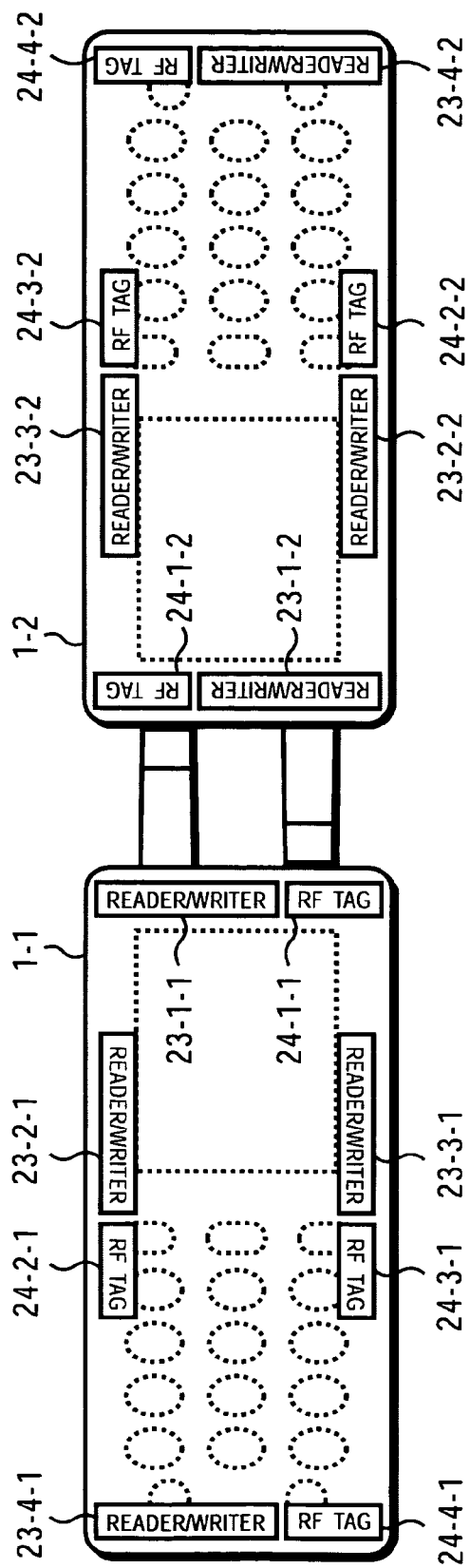
FIG. 14 is a diagram illustrating correspondence of the reader/writer 23 and the RF tag 24 which communicate with each other.

When the top side of the cellular telephone 1-1 is adjacent to the top side of the cellular telephone 1-2 in the manner shown in FIG. 13, as shown in FIG. 14, the reader/writer 23-1-1 of the cellular telephone 1-1 and the RF tag 24-1-2 of the cellular telephone 1-2 communicate with each other, or the reader/writer 23-1-2 of the cellular telephone 1-2 and the RF tag 24-1-1 of the cellular telephone 1-1 communicate with each other.

For example, the reader/writer 23-1-1 of the cellular telephone 1-1 periodically transmits electromagnetic waves at sufficiently short intervals. When the RF tag 24-1-2 of the adjacent cellular telephone 1-2 is placed adjacent thereto, the reader/writer 23-1-1 and the RF tag 24-1-2 are electromagnetically coupled to each other, thereby changing the equivalent impedance of the antenna 85 built in the reader/writer 23-1-1. Under the control of the reader/writer control program 173-1, the reader/writer 23-11 monitors the change in impedance to determine whether or not the cellular telephone 1-2 is adjacent thereto.

The reader/writer 23-1-1 of the cellular telephone 1-1 issues a request for the device name of the communication unit 22-2, which is a Bluetooth device, to the RF tag 24-1-2 of the adjacent cellular telephone 1-2.

The RF tag 24-1-2 of the cellular telephone 1-2 transmits the device name of the communication unit 22-2 to the reader/writer 23-1-1 of the cellular telephone 1-1 in response to the request from the reader/writer 23-1-1 of the cellular telephone 1-1.

When receiving the device name of the communication unit 22-2 from the RF tag 24-1-2 of the cellular telephone 1-2, the reader/writer 23-1-1 of the cellular telephone 1-1 supplies the device name to the communication unit 22-1.

The communication unit 22-1 of the cellular telephone 1-1 sets up a connection with the communication unit 22-2 of the cellular telephone 1-2 based on the device name of the communication unit 22-2 supplied from the RF tag 24-1-2 of the cellular telephone 1-2 to establish a communication link therewith.

The cellular telephone 1-1 transmits the electronic mail containing "ABCDEFGHIJ . . . " to the cellular telephone 1-2 over the established communication link.

Figure 15:
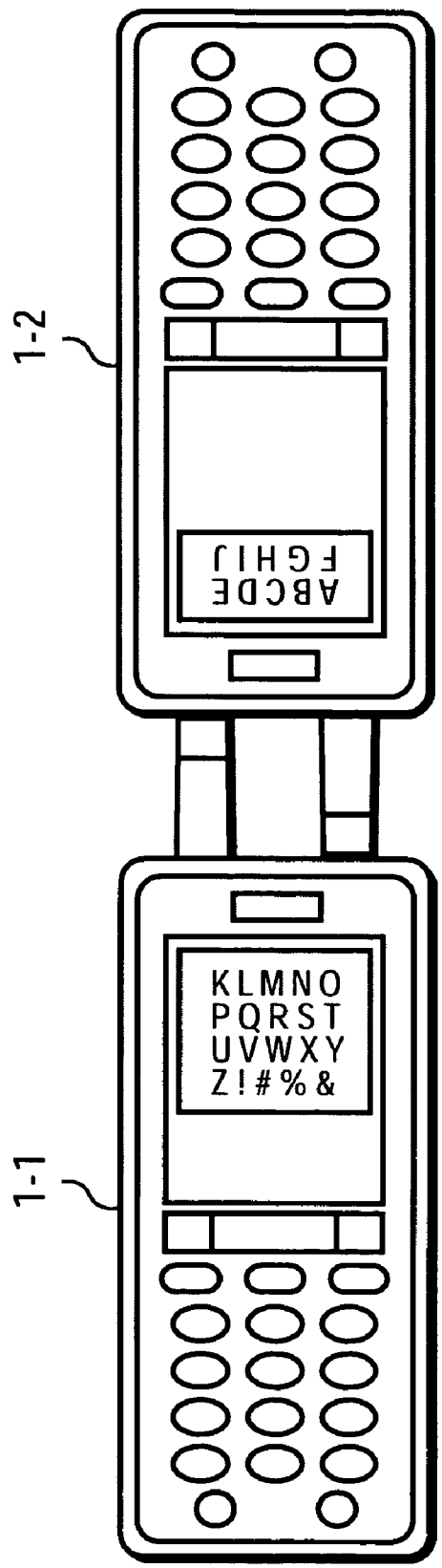
FIG. 15 is a diagram illustrating the display example corresponding to communication between the cellular telephone 1-1 and the cellular telephone 1-2.
Figure 16:
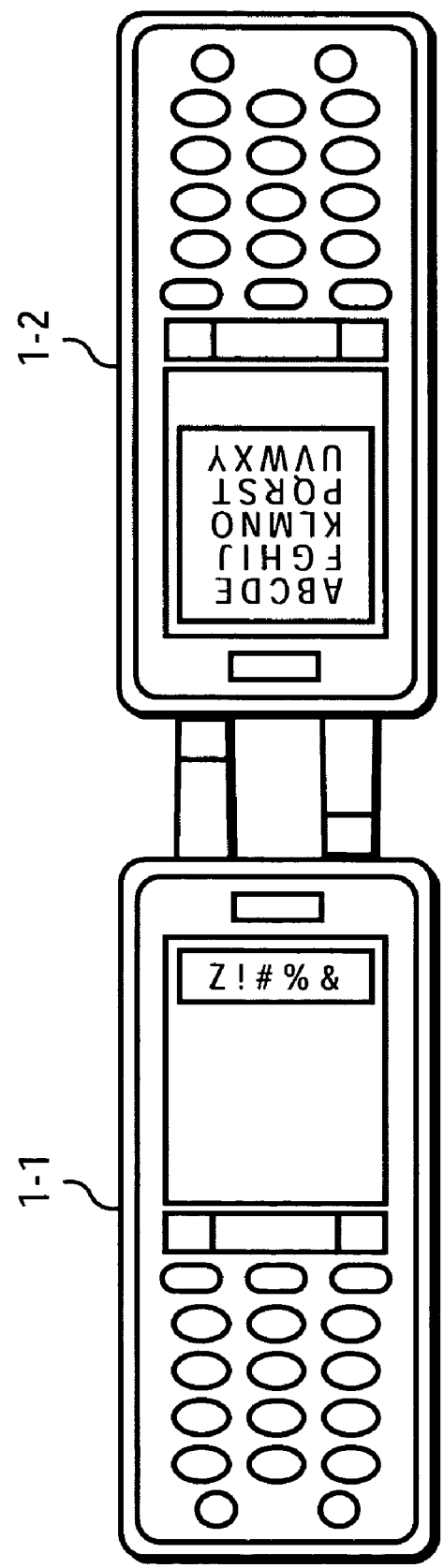
FIG. 16 is a diagram illustrating the display example corresponding to communication between the cellular telephone 1-1 and the cellular telephone 1-2.
Figure 17:
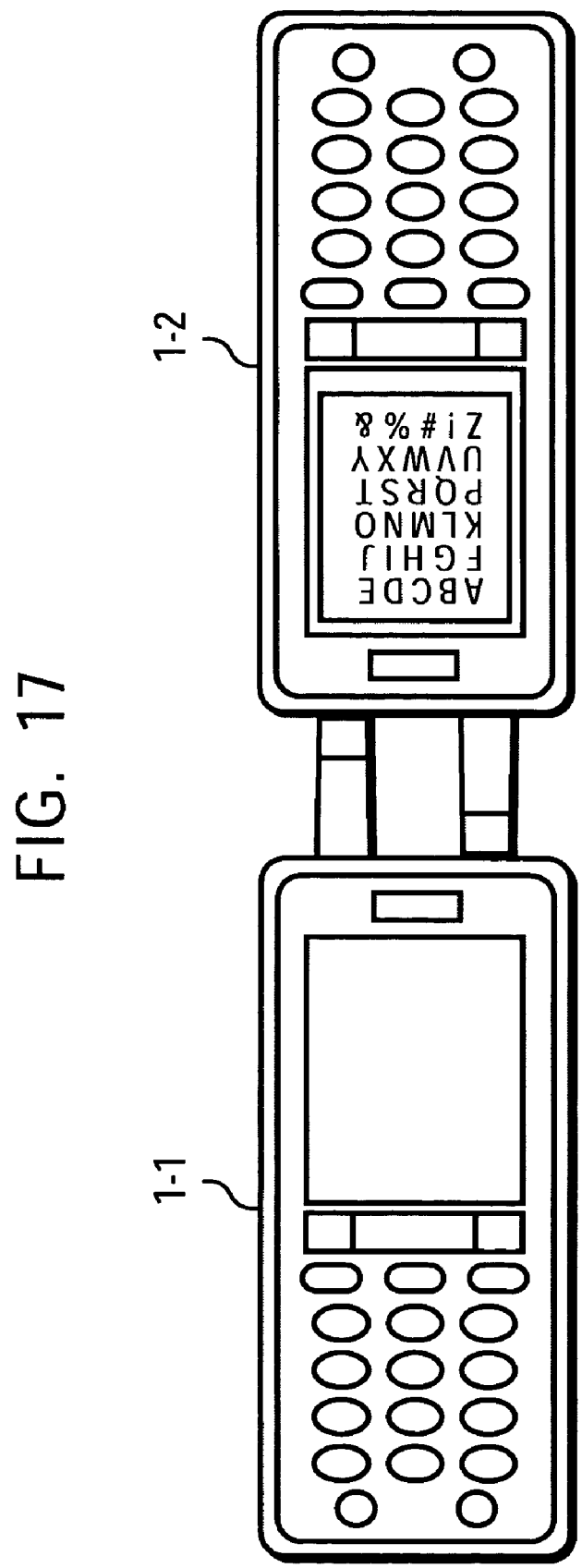
FIG. 17 is a diagram illustrating the display example corresponding to communication between the cellular telephone 1-1 and the cellular telephone 1-2.

As shown in FIGS. 15 through 17, the cellular telephone 1-1 sequentially updates the displayed electronic mail in such a manner that the number of characters of the electronic mail decreases, based on the position of the communicating reader/writer 23-1-1, toward the reader/writer 23-1-1. As shown in FIGS. 15 through 17, the cellular telephone 1-2 sequentially displays the electronic mail in such a manner that the number of characters in the electronic mail increases, based on the position of the communicating RF tag 24-1-2, from the side of the RF tag 24-1-2.

For example, as shown in FIG. 15, the cellular telephone 1-1 updates the displayed electronic mail in such a manner that the first and second rows of the displayed electronic mail are sequentially deleted. That is, in the cellular telephone 1-1, an electronic mail in which the first and second rows are deleted and "KLMNO", "PQRST", "UVWXY", and so on remain in the first row, the second row, the third row, and so on, respectively, is displayed on the upper portion of the LCD 17-1.

As shown in FIG. 15, the cellular telephone 1-2 displays the electronic mail in such a manner that the first and second rows of the electronic mail are sequentially displayed. That is, in the cellular telephone 1-2, an electronic mail in which "ABCDE" and "FGHIJ" are present in the first and second rows, respectively, is displayed on the upper portion of the LCD 17-2.

Then, as shown in FIG. 16, the cellular telephone 1-1 updates the displayed electronic mail in such a manner that the third through fifth rows of the electronic mail under transmission are further deleted sequentially. That is, in the cellular telephone 1-1, an electronic mail in which the first through third rows shown in FIG. 15 are deleted and "Z!#%&" remain in the first row is displayed on the upper portion of the LCD 17-1.

As shown in FIG. 16, the cellular telephone 1-2 displays the electronic mail in such a manner that the third through fifth rows of the electronic mail are further displayed sequentially. That is, in the cellular telephone 1-2, an electronic mail in which "ABCDE", "FGHIJ", "KLMNO", "PQRST", and "UVWXY" are present in the first row, the second row, the third row, the fourth row, and the fifth row, respectively, is displayed on the upper portion of the LCD 17-2.

Then, as shown in FIG. 17, in the cellular telephone 1-1, the sixth row of the displayed electronic mail is deleted, so that the whole electronic mail is deleted.

As shown in FIG. 17, in the cellular telephone 1-2, the sixth row of the electronic mail is further displayed, so that the whole electronic mail is displayed.

Also in the case discussed with reference to FIGS. 13 through 17, a user is able to know that the electronic mail has been transmitted from the cellular telephone 1-1 to the cellular telephone 1-2, and is also able to know that transmission of the electronic mail is completed.

Figure 18:
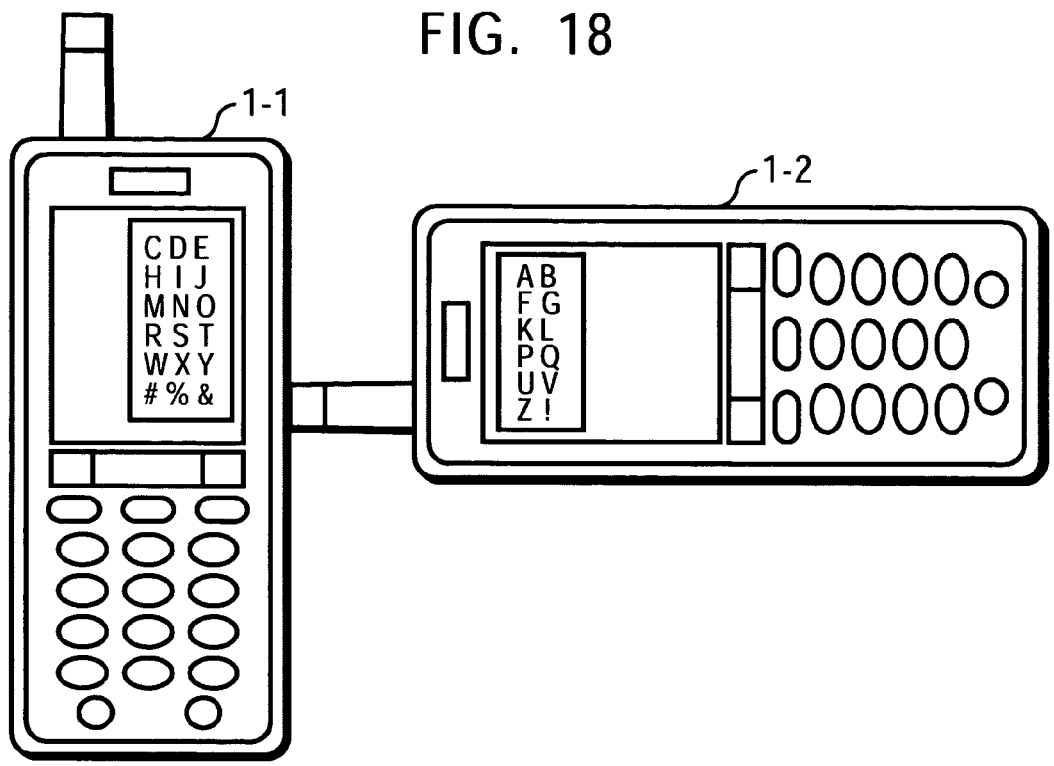
FIG. 18 is a diagram illustrating a display example corresponding to communication between the cellular telephone 1-1 and the cellular telephone 1-2.
Figure 19:
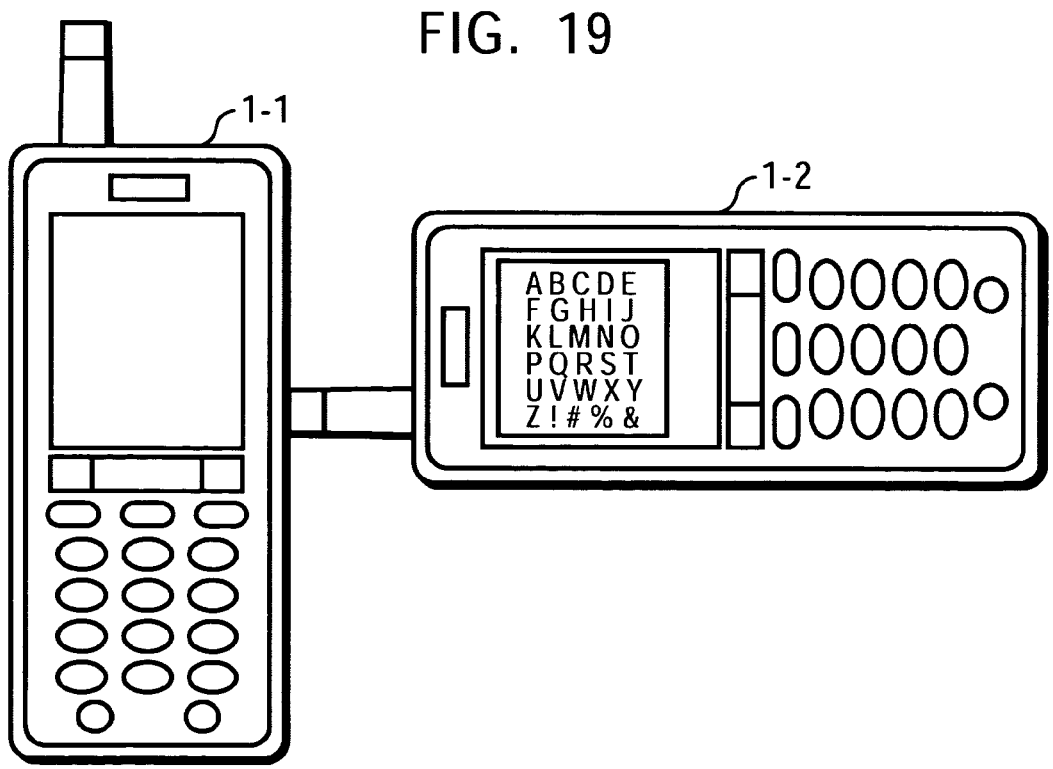
FIG. 19 is a diagram illustrating the display example corresponding to communication between the cellular telephone 1-1 and the cellular telephone 1-2.
Figure 20:
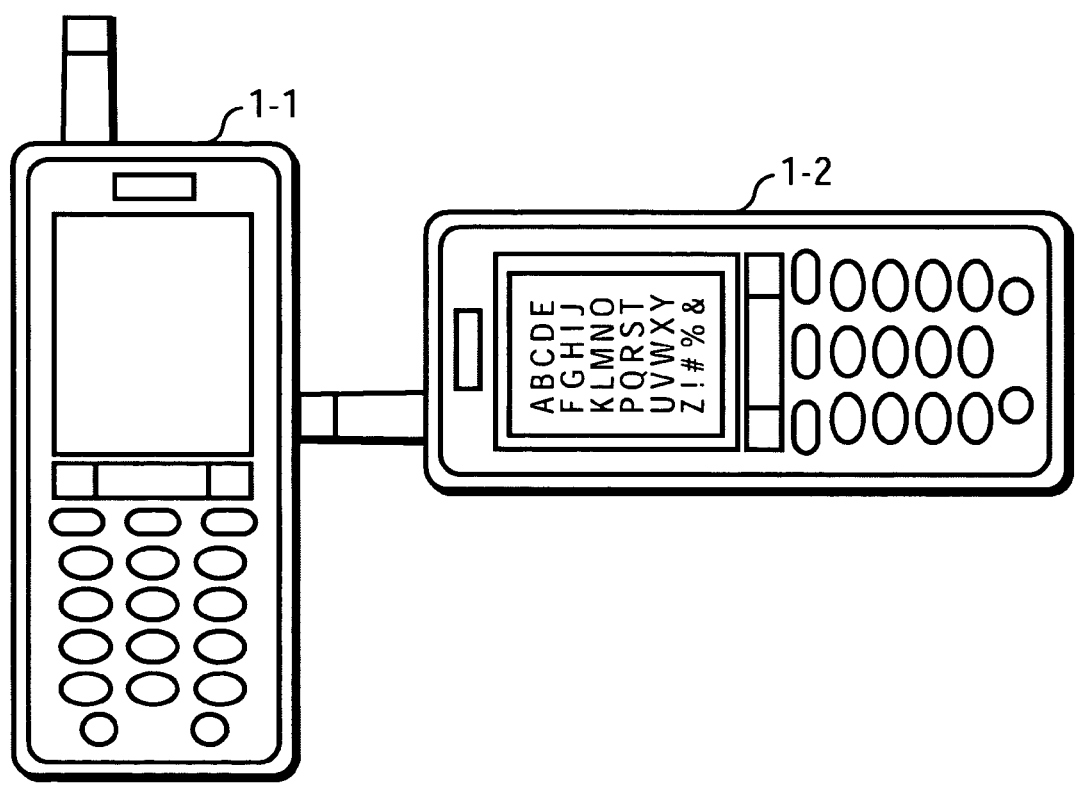
FIG. 20 is a diagram illustrating the display example corresponding to communication between the cellular telephone 1-1 and the cellular telephone 1-2.

FIGS. 18 through 20 are diagrams illustrating a display corresponding to communication between the cellular telephone 1-1 and the cellular telephone 1-2 when the right side of the cellular telephone 1-1 is adjacent to the top side of the cellular telephone 1-2.

As shown in FIG. 18, when the right side of the cellular telephone 1-1 is adjacent to the top side of the cellular telephone 1-2, the reader/writer 23-3-1 of the cellular telephone 1-1 and the RF tag 24-1-2 of the cellular telephone 1-2 communicate with each other, or the reader/writer 23-1-2 of the cellular telephone 1-2 and the RF tag 24-3-1 of the cellular telephone 1-1 communicate with each other.

For example, the reader/writer 23-3-1 of the cellular telephone 1-1 periodically transmits electromagnetic waves at sufficiently short intervals. When the RF tag 24-1-2 of the adjacent cellular telephone 1-2 is placed adjacent thereto, the reader/writer 23-3-1 and the RF tag 24-1-2 are electromagnetically coupled to each other, thereby changing the equivalent impedance of the antenna 85 built in the reader/writer 23-3-1. Under the control of the reader/writer control program 173-1, the reader/writer 23-3-1 monitors the change in impedance to determine whether or not the cellular telephone 1-2 is adjacent thereto.

The reader/writer 23-3-1 of the cellular telephone 1-1 issues a request for the device name of the communication unit 22-2, which is a Bluetooth device, to the RF tag 24-1-2 of the adjacent cellular telephone 1-2.

The RF tag 24-1-2 of the cellular telephone 1-2 transmits the device name of the communication unit 22-2 to the reader/writer 23-3-1 of the cellular telephone 1-1 in response to the request from the reader/writer 23-3-1 of the cellular telephone 1-1.

When receiving the device name of the communication unit 22-2 from the RF tag 24-1-2 of the cellular telephone 1-2, the reader/writer 23-3-1 of the cellular telephone 1-1 supplies the device name to the communication unit 22.

The reader/writer 23-3-1 of the cellular telephone 1-1 transmits the position of the reader/writer 23-3-1 to the RF tag 24-1-2 of the cellular telephone 1-2.

The RF tag 24-1-2 of the cellular telephone 1-2 receives the position of the reader/writer 23-3-1 transmitted from the reader/writer 23-3-1 of the cellular telephone 1-1.

The communication unit 22-1 of the cellular telephone 1-1 sets up a connection with the Bluetooth device of the cellular telephone 1-2 based on the device name of the Bluetooth device supplied from the RF tag 24-1-2 of the cellular telephone 1-2 to establish a communication link therewith.

The cellular telephone 1-1 transmits an electronic mail containing "ABCDEFGHIJ . . . " to the cellular telephone 1-2 over the established communication link.

As shown in FIGS. 18 through 20, the cellular telephone 1-1 sequentially updates the displayed electronic mail in such a manner that the number of characters of the electronic mail decreases, based on the position of the communicating reader/writer 23-3-1, toward the reader/writer 23-3-1. As shown in FIGS. 18 through 20, the cellular telephone 1-2 sequentially displays the electronic mail in such a manner that the number of characters in the electronic mail increases, based on the position of the communicating RF tag 24-1-2, from the side of the RF tag 24-1-2. The cellular telephone 1-2 sequentially displays the electronic mail based on the received position of the reader/writer 23-3-1 so as to correspond to the updated display in the cellular telephone 1-1.

For example, as shown in FIG. 18, the cellular telephone 1-1 updates the displayed electronic mail in such a manner that the first and second characters in each row of the displayed electronic mail are sequentially deleted. That is, in the cellular telephone 1-1, an electronic mail in which the first and second characters in each row are deleted and "CDE", "HIJ", "MNO", and so on remain in the first row, the second row, the third row, and so on, respectively, is displayed on the right portion of the LCD 17-1.

As shown in FIG. 18, since the characters deleted from the display by the cellular telephone 1-1 can be determined based on the received position of the reader/writer 23-3-1, the cellular telephone 1-2 sequentially displays the electronic mail in such a manner that the first and second characters in each row of the electronic mail are sequentially displayed in the same direction as in the cellular telephone 1-1. That is, in the cellular telephone 1-2, an electronic mail in which "AB", "FG", "KL", and so on are present in the first row, the second row, the third row, and so on, respectively, is turned and displayed on the LCD 17-2.

Then, as shown in FIG. 19, in the cellular telephone 1-1, the third through fifth characters in each row of the displayed electronic mail are deleted, so that the whole electronic mail is deleted.

As shown in FIG. 19, in the cellular telephone 1-2, the third through fifth characters in each row of the electronic mail are displayed, so that the whole electronic mail is displayed.

Then, as shown in FIG. 20, the cellular telephone 1-2 displays the electronic mail in the correct orientation on the LCD 17-2.

In this way, the cellular telephone 1-1 and the cellular telephone 1-2 are able to display the electronic mail message based on the adjacent position so as to correspond to the electronic mail under transmission.

When the right side of the cellular telephone 1-1 and the top side of the cellular telephone 1-2 are adjacent to each other and the cellular telephone 1-2 receives an electronic mail message, the cellular telephone 1-2 may sequentially display the electronic mail row-by-row, starting from the first row, on the upper portion of the LCD 17-2 in the manner shown in FIGS. 15 through 17.

For example, when the bottom side of the cellular telephone 1-1 and the bottom side of the cellular telephone 1-2 are adjacent to each other during transmission of an electronic mail message, the cellular telephone 1-1 displays the electronic mail under transmission on the lower portion of the LCD 17-1 based on the position of the reader/writer 23-4-1, and the cellular telephone 1-2 displays the received electronic mail on the lower portion of the LCD 17-2 based on the position of the RF tag 24-4-2.

Figure 21:
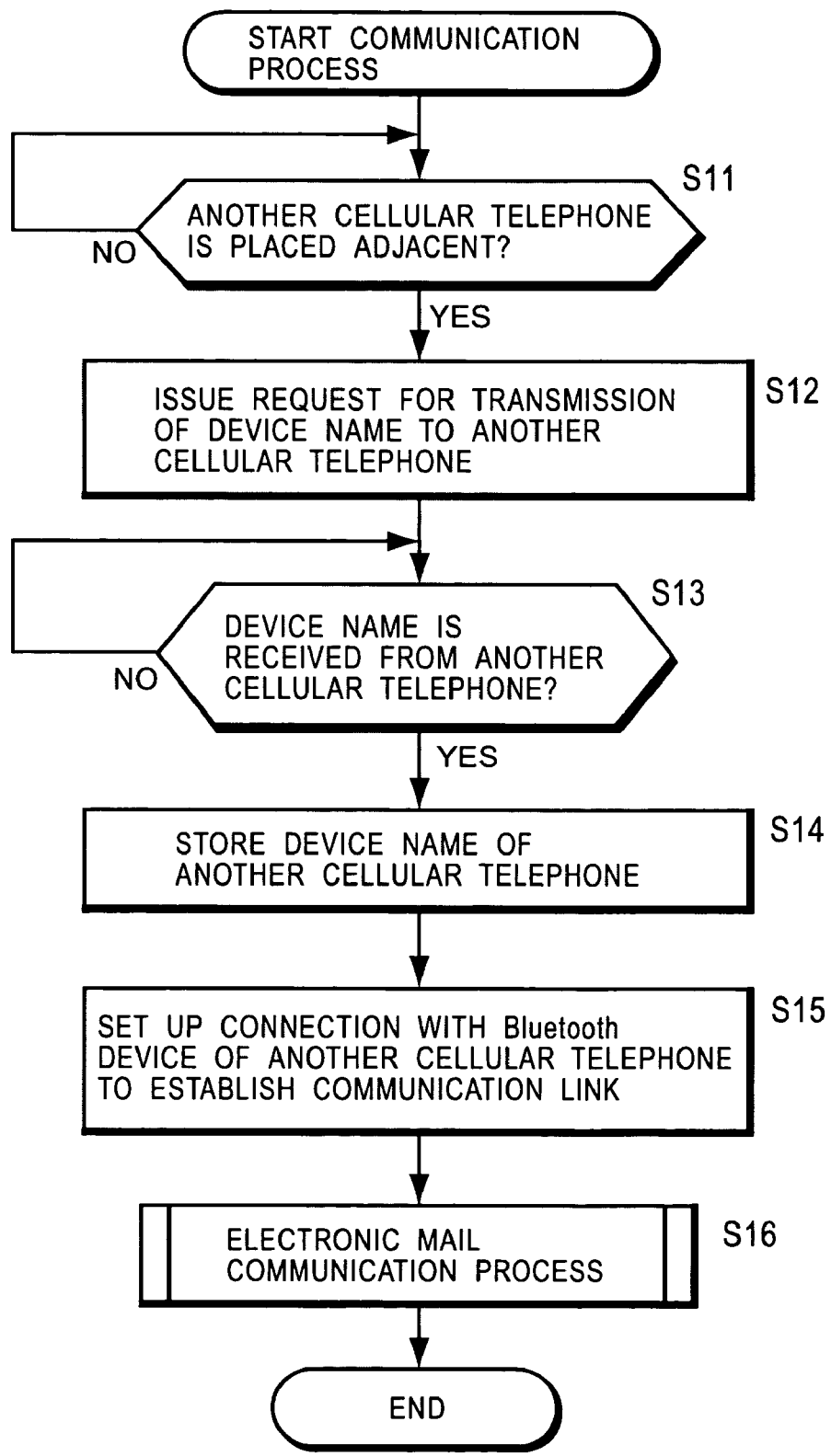
FIG. 21 is a flowchart showing a communication process of the cellular telephone 1-1.

The communication processes of the cellular telephone 1-1 and the cellular telephone 1-2 are described below with reference to the flowcharts shown in FIGS. 21 and 22, respectively. For data communication between the cellular telephone 1-1 and the cellular telephone 1-2, users place the cellular telephone 1-1 and the cellular telephone 1-2 adjacent to each other.

The readers/writers 23-1-1 through 23-4-1 of the cellular telephone 1-1 periodically transmit electromagnetic waves at sufficiently short intervals. When the cellular telephone 1-2 is adjacent thereto, any of the readers/writers 23-1-1 through 23-4-1 of the cellular telephone 1-1 is electromagnetically coupled to any of the RF tags 24-1-2 through 24-4-2 of the cellular telephone 1-2, thereby changing the equivalent impedance of the antenna 85 built in any of the readers/writers 23-1-1 through 23-4-1. In step S11 shown in FIG. 21, the reader/writer control program 173-1 monitors the change in equivalent impedance of the antenna 85 of any of the readers/writers 23-1-1 through 23-4-1 to determine whether or not the cellular telephone 12 is adjacent thereto, and stands by until it is placed adjacent thereto.

When the cellular telephone 1-2 is placed adjacent thereto, then in step S12, the reader/writer control program 173-1 causes any of the readers/writers 23-1-1 through 23-4-1 to issue a request for transmission of the device name of the communication unit 22-2, which is a Bluetooth device, to the cellular telephone 1-2.

The device name of the communication unit 22-2 is transmitted from the cellular telephone 1-2 in response to this request, as described below, and, in step S13, the reader/writer control program 173-1 causes any of the readers/writers 23-1-1 through 23-4-1 to stand by until the device name of the communication unit 22-2 is received from the cellular telephone 1-2. When it is received, the process proceeds to step S14, in which the received device name of the communication unit 22-2 of the cellular telephone 1-2 is supplied to the Bluetooth control program 174-1. The Bluetooth control program 174-1 supplies and stores the device name to the RAM 13-1.

Then, in step S15, the Bluetooth control program 174-1 controls the communication unit 22-1 to set up a connection with the communication unit 22-2 of the cellular telephone 1-2 corresponding to the device name stored in step S14 to establish a link necessary for data transfer.

Specifically, when the communication unit 22-2 of the cellular telephone 1-2 is in a standby phase, the Bluetooth control program 174-1 causes the communication unit 22-1 to execute an inquiry and paging of a synchronization setup phase to set up synchronization to the communication unit 22-2 of the cellular telephone 1-2.

When the communication unit 22-1 and the communication unit 22-2 are synchronized, the communication unit 22-1 of the cellular telephone 1-1 and the communication unit 22-2 of the cellular telephone 1-2 enter a communication connecting phase.

The Bluetooth control program 174-1 causes the communication unit 22-1 to transmit a control packet for setting up a communication link to a Bluetooth device of the cellular telephone 1-2 out of Bluetooth devices in a piconet which is synchronized in frequency and time thereto and which corresponds to the device name, i.e., the communication unit 22-2 of the cellular telephone 1-2, and to set up an ACL (Asynchronous Connection-Less) link necessary for the processing of the subsequent step.

Then, in step S16, the cellular telephone 1-1 performs a process for communicating an electronic mail with the cellular telephone 1-2 over the network. A specific example of this process is described below.

Figure 22:
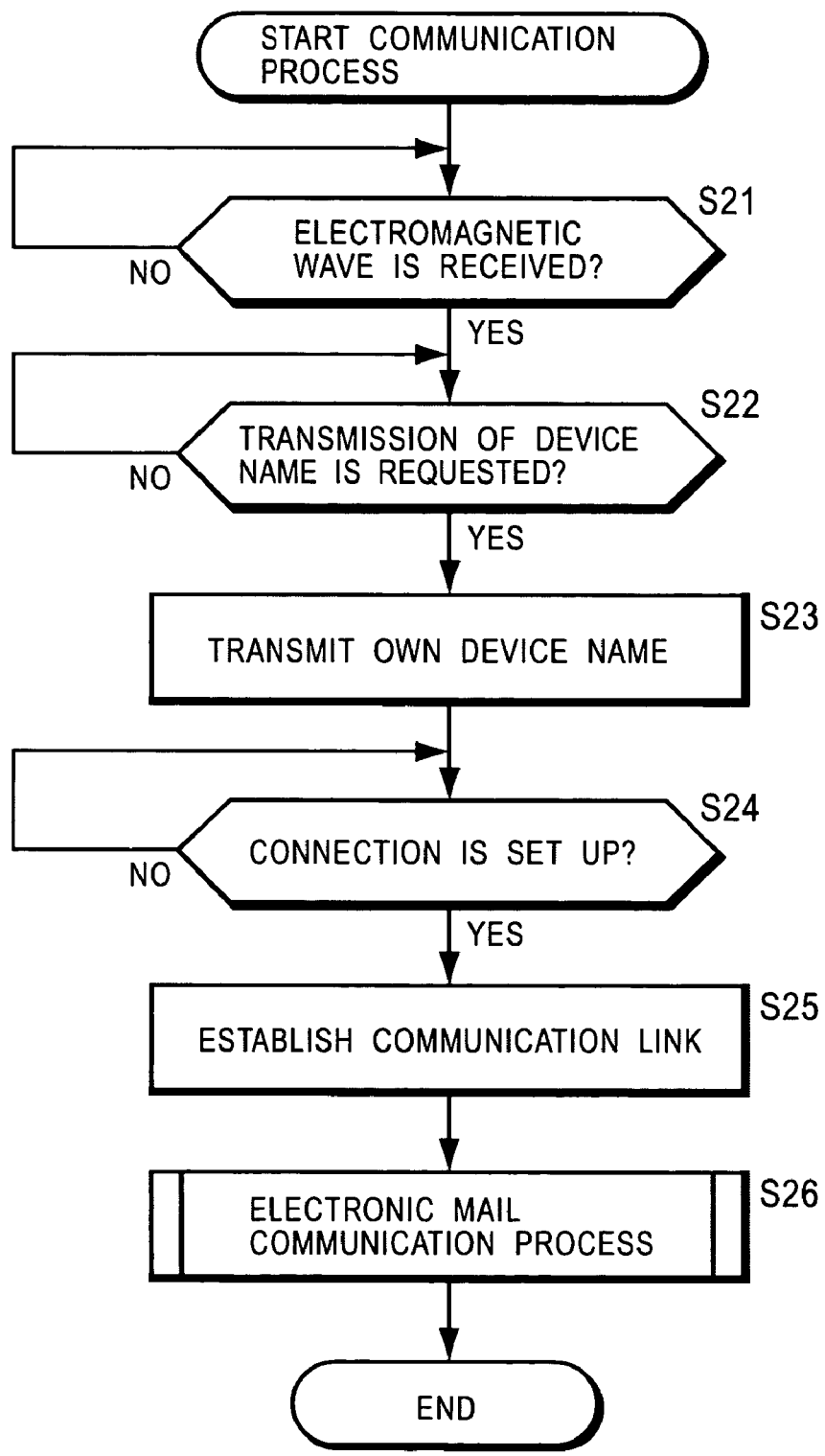
FIG. 22 is a flowchart showing a communication process of the cellular telephone 1-2.

Meanwhile, in step S21 shown in FIG. 22, the RF tag control program 172-2 of the cellular telephone 1-2 determines whether or not any of the RF tags 24-1-2 through 24-4-2 has received electromagnetic waves from any of the readers/writers 23-1-1 through 23-4-1 of the cellular telephone 1-1 (determines whether or not the cellular telephone 1-2 is adjacent to the cellular telephone 1-1). When it is determined that the cellular telephone 1-1 is adjacent thereto, the process proceeds to step S22, in which the RF tag control program 172-2 of the cellular telephone 1-2 causes any of the RF tags 24-1-2 through 24-4-2 of the cellular telephone 1-2 to stand by until transmission of the device name of the communication unit 22-2, which is a Bluetooth unit, is requested. As discussed above, any of the readers/writers 23-1-1 through 23-4-1 of the cellular telephone 1-1 issues a request for transmission of the device name of a Bluetooth device to the cellular telephone 1-2 in step S12. Thus, when it is determined that the transmission request has been received, the process proceeds to step S23, in which the RF tag control program 172-2 causes the RF tags 24-1-2 through 24-4-2 of the cellular telephone 1-2 to read the device name of the Bluetooth device stored in the internal memory to transmit the device name to any of the readers/writers 23-1-1 through 23-4-1 of the cellular telephone 1-1.

The Bluetooth device name may be stored in the ROM 12-2 or the storage unit 18-2 of the cellular telephone 1-2. In this case, the device name read therefrom by the CPU 11-2 of the cellular telephone 1-2 is transmitted from any of the RF tags 24-1-2 through 24-4-2 of the cellular telephone 1-2.

In step S24, the Bluetooth control program 174-2 of the cellular telephone 1-2 stands by until a connection between the communication unit 22-1 of the cellular telephone 1-1 and the communication unit 22-2 of the cellular telephone 12 has been set up via Bluetooth communication (in this case, the Bluetooth control program 174-2 stands by until a connection has been set up in the communication connecting phase).

When it is determined in step S24 that a connection between the communication unit 22-2 of the cellular telephone 1-2 and the communication unit 22-1 of the cellular telephone 1-1 has been set up via Bluetooth communication, the process proceeds to step S25, in which the Bluetooth control program 174-2 causes the communication unit 22-2 to receive a control packet for setting up a communication link, which is transmitted by the communication unit 22-1 of the cellular telephone 1-1 in step S15, to establish a communication link with the cellular telephone 1-1.

Then, the process proceeds to step S26, in which the cellular telephone 1-2 performs a process for communicating an electronic mail with the cellular telephone 1-1 over the network. This process is associated with the processing of step S16 shown in FIG. 21.

An electronic mail communication process corresponding to step S16 and performed by the cellular telephone 1-1 executing the display control program 175-1 is described below with reference to the flowchart shown in FIG. 23.

In step S41, the display control program 175-1 causes the host program 171-1 to read the senders and subjects of the previously received electronic mails which are stored in the RAM 13-1. In step S42, the display control program 175-1 causes the communication unit 22-1 to transmit the read mail senders and subjects to the cellular telephone 1-2. That is, the CPU 11-1 which executes the Bluetooth control program 174-1 controls the communication unit 22-1 to transmit the electronic mail senders and subjects to the cellular telephone 1-2 via Bluetooth communication.

The transmitted mail senders and subjects are displayed on the LCD 17-2 of the cellular telephone 1-2, as discussed below. When a user selects certain one of the displays, this selection is transmitted to the cellular telephone 1-1.

In step S43, the display control program 175-1 stands by until the selected electronic mail is informed. When the selected electronic mail is informed, the process proceeds to step S44, in which the display control program 175-1 causes the host program 171-1 to read the content of the selected electronic mail from the RAM 13-1, and causes the Bluetooth control program 174-1 to transmit the content of the read electronic mail to the cellular telephone 1-2 from the communication unit 22-1.

In step S45, the display control program 175-1 causes the content of the electronic mail transmitted in step S44 to be displayed on the LCD 17-1.

In step S46, the display control program 175-1 sequentially updates the content of the displayed electronic mail based on the position of any communicating one of the readers/writer 23-1-1 through 23-4-1, and then the process ends.

As an example, when the reader/writer 23-3-1 communicates with the cellular telephone 1-2, in step S46, the display control program 175-1 updates the display in such a manner that the characters in each row of the electronic mail are sequentially deleted, starting from the leftmost character, as discussed above with reference to FIGS. 10 through 12.

As another example, when the reader/writer 23-1-1 communicates with the cellular telephone 1-2, the display control program 175-1 updates the display in such a manner that the rows of the electronic mail are sequentially deleted, starting from the uppermost row, as discussed above with reference to FIGS. 15 through 17.

Figure 24:
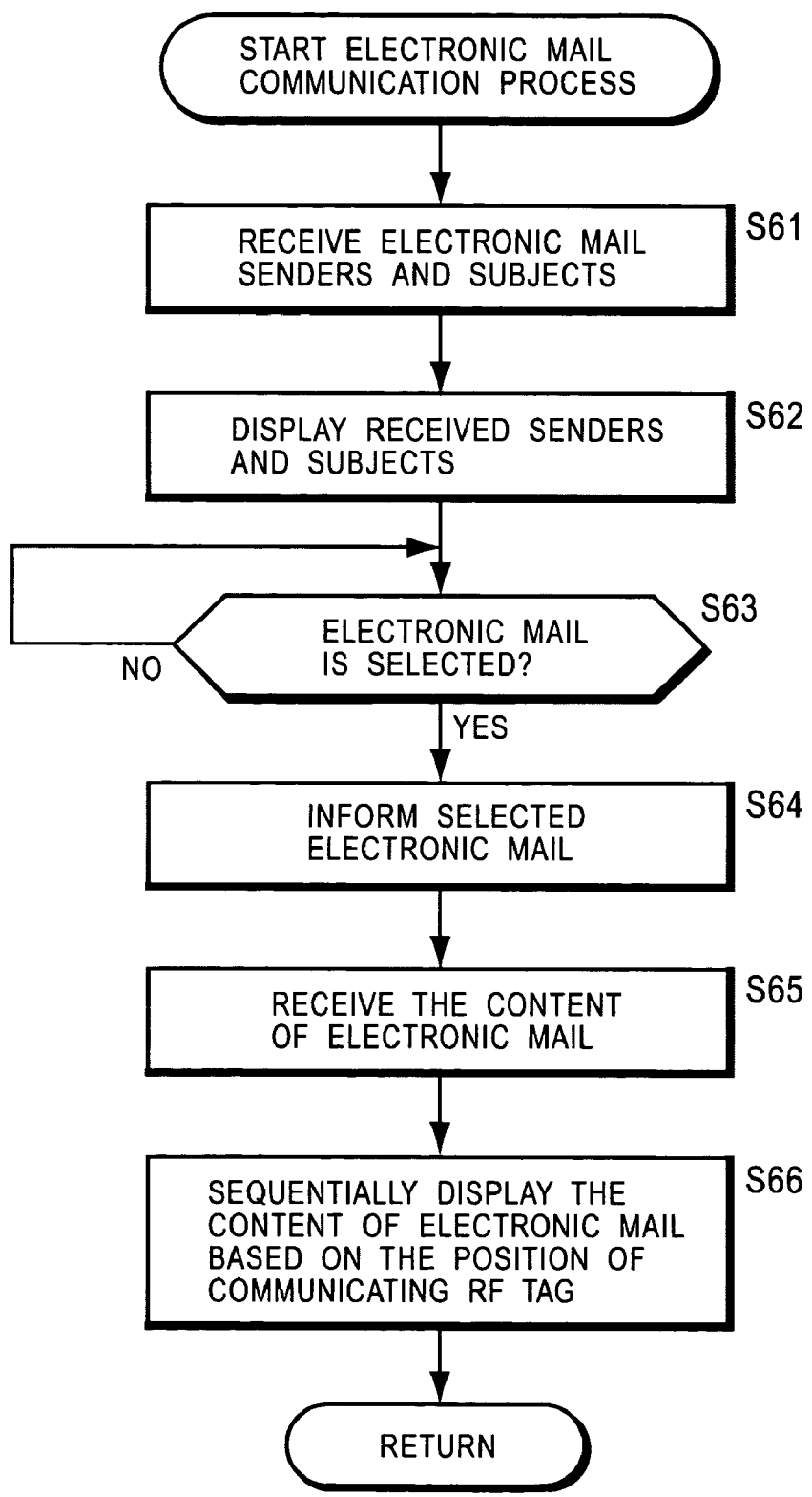
FIG. 24 is a flowchart showing an electronic mail communication process of the cellular telephone 1-2.

In association with the process of the cellular telephone 1-1, the cellular telephone 1-2 performs a process of the flowchart shown in FIG. 24.

First, in step S61, the display control program 175-2 of the cellular telephone 1-2 receives the electronic mail senders and subjects transmitted from the cellular telephone 1-1. That is, the communication unit 22-2 of the cellular telephone 1-2 receives the electronic mail senders and subjects transmitted from the communication unit 22-1 of the cellular telephone 1-1 via Bluetooth communication, and supplies and stores them to the RAM 13-2. In step S62, the display control program 175-2 of the cellular telephone 1-2 reads the senders and subjects stored in the RAM 13-2, and outputs them to the LCD 17-2 for display. Then, the electronic mail senders and subjects transmitted from the cellular telephone 1-1 are displayed on the LCD 17-2.

A user operates the input unit 16-2 while viewing the display to specify the sender and subject of one of the electronic mails on the LCD 17-2 to select the electronic mail. In step S63, the display control program 175-2 of the cellular telephone 1-2 stands by until an electronic mail is selected. When an electronic mail is selected, the process proceeds to step S64, in which the selected electronic mail is informed of the cellular telephone 1-1. Specifically, the Bluetooth control program 174-2 of the cellular telephone 1-2 controls the communication unit to inform of the cellular telephone 1-1 which electronic mail is specified (selected) by the user via Bluetooth communication.

When the selected electronic mail is informed, as discussed above, the content of the selected electronic mail is transmitted from the cellular telephone 1-1, and in step S65, the display control program 175-2 of the cellular telephone 1-2 causes the Bluetooth control program 174-2 to receive, at the communication unit 22-2, the content of the electronic mail transmitted from the cellular telephone 1-1. The content of the electronic mail is supplied and stored to the RAM 13-2 of the cellular telephone 1-2. Then, in step S66, the display control program 175-2 of the cellular telephone 1-2 reads the content of the mail stored in the RAM 13-2, and sequentially displays the content of the electronic mail on the LCD 17-2 based on the position of any communicating one of the RF tags 24-1-2 through 24-4-2. Then, the process ends.

As an example, when the RF tag 24-2-2 communicates with the cellular telephone 1-1, in step S66, the display control program 175-2 of the cellular telephone 1-2 displays the electronic mail in such a manner that the characters in each row are sequentially displayed, starting from the leftmost character, as discussed above with reference to FIGS. 10 through 12.

As another example, when the RF tag 24-1-2 communicates with the cellular telephone 1-1, the display control program 175-2 displays the electronic mail in such a manner that the rows of the electronic mail are sequentially displayed, starting from the uppermost row, as discussed above with reference to FIGS. 15 through 17.

Thus, the user is able to know that the electronic mail has been transmitted from the cellular telephone 1-1 to the cellular telephone 1-2, and is also able to know that transmission of the electronic mail is completed.

Another electronic mail communication process is described below.

Figure 25:
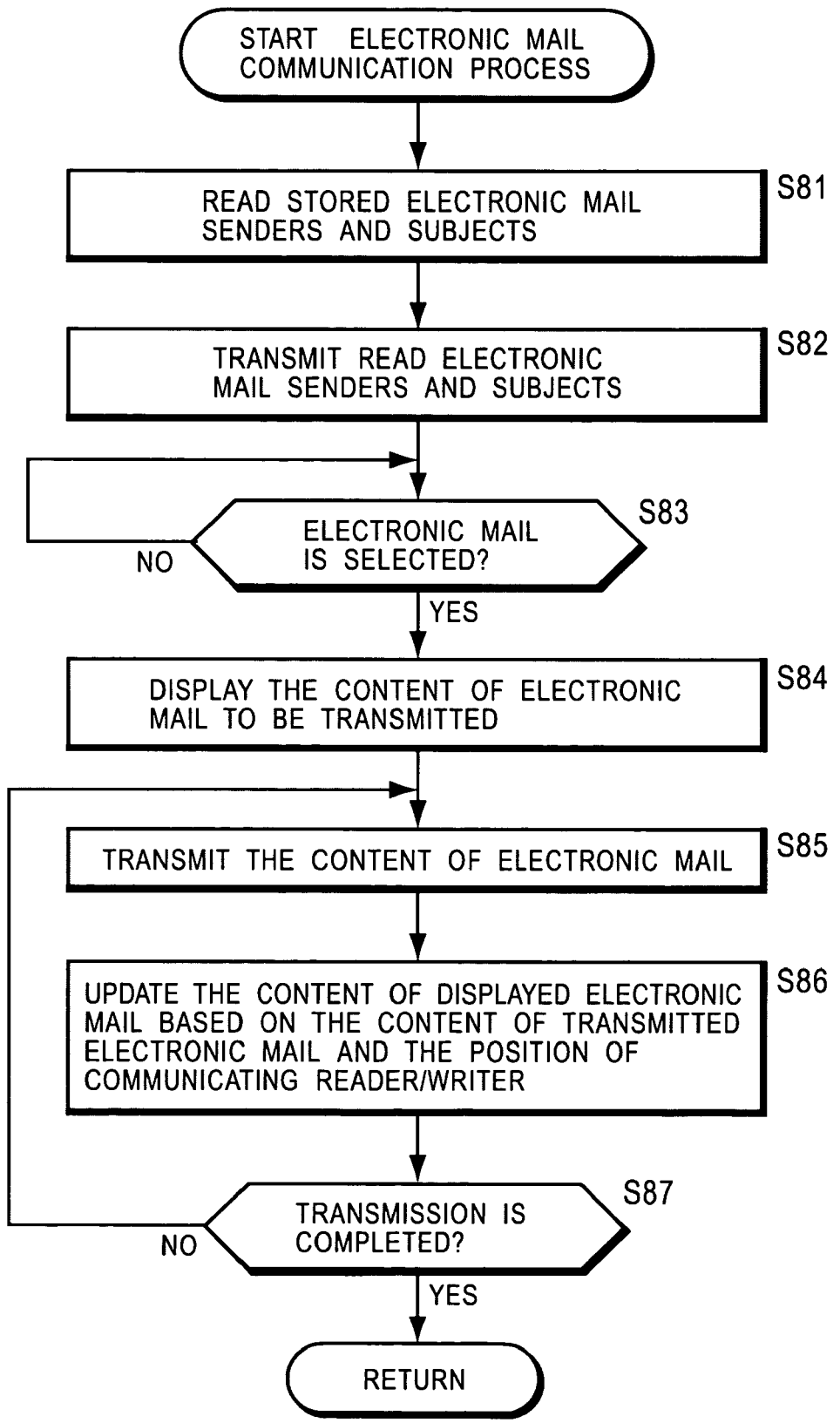
FIG. 25 is a flowchart showing an electronic mail communication process of the cellular telephone 1-1.

Another electronic mail communication process corresponding to step S16 and performed by the cellular telephone 1-1 executing the display control program 175-1 is described below with reference to the flowchart shown in FIG. 25.

Figure 23:
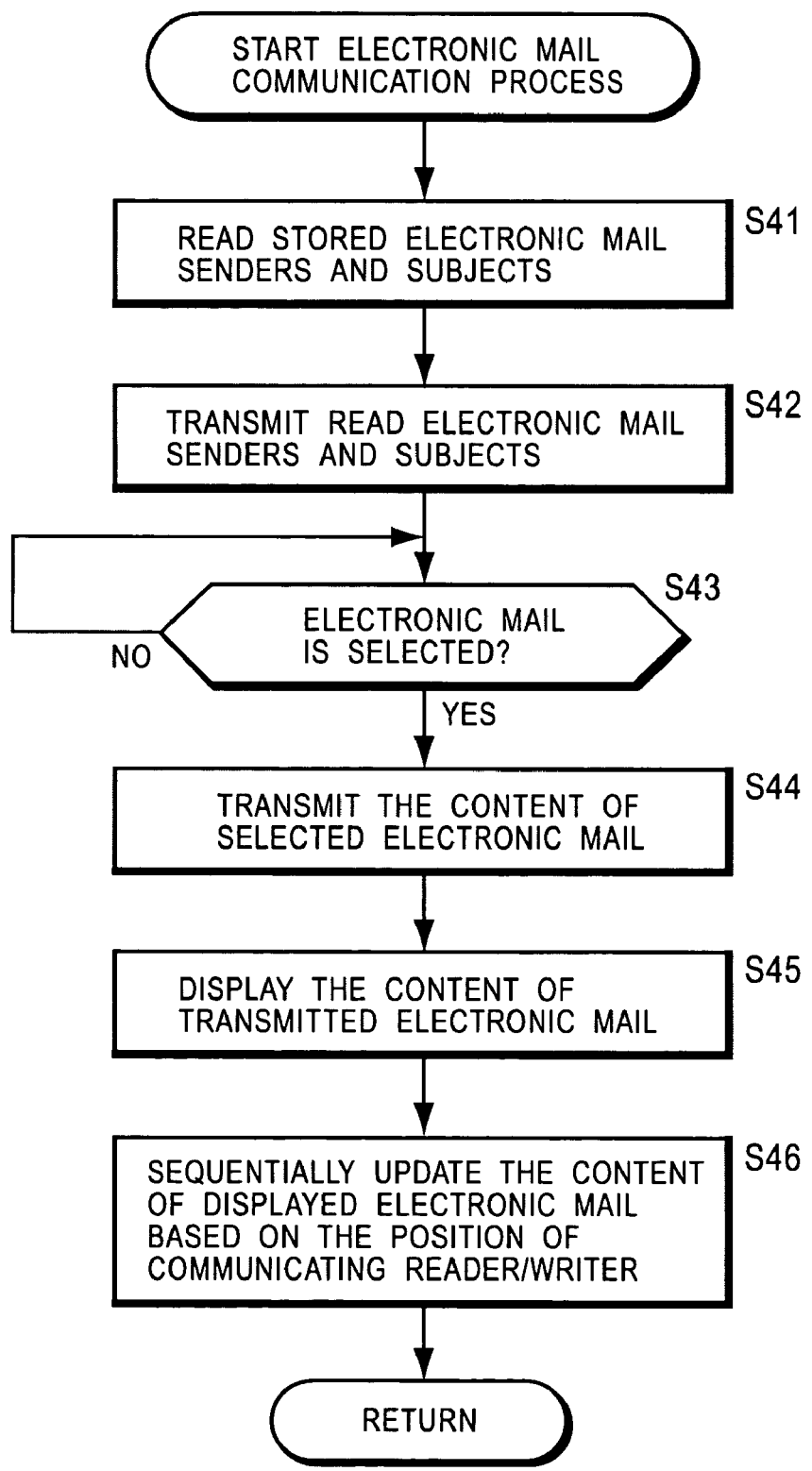
FIG. 23 is a flowchart showing an electronic mail communication process of the cellular telephone 1-1.

The processings of steps S81 through S83 are similar to the processings of steps S41 through S43 of the flowchart shown in FIG. 23, respectively, and a description thereof is thus omitted.

In step S84, the display control program 175-1 causes the host program 171-1 to read the content of the selected electronic mail from the RAM 13-1, and to display the content of the electronic mail under transmission (the selected electronic mail) on the LCD 17-1.

In step S85, the display control program 175-1 causes the Bluetooth control program 174-1 to transmit the content of the electronic mail to the cellular telephone 1-2 from the communication unit 22-1. The process for transmitting the content of the electronic mail is executed in parallel to the processing of steps S86 and S87.

In step S86, the display control program 175-1 updates the content of the displayed electronic mail based on the content of the transmitted electronic mail and the position of any communicating one of the readers/writers 23-1-1 through 23-4-1.

In step S87, the display control program 175-1 obtains the communication status from the Bluetooth control program 174-1 to determine whether or not transmission of the electronic mail is completed. When it is determined that transmission of the electronic mail is not completed, the process returns to step S85, and the process for transmitting the electronic mail and the process for updating the display are repeated.

When it is determined in step S87 that transmission of the electronic mail is completed, the process ends.

Figure 26:
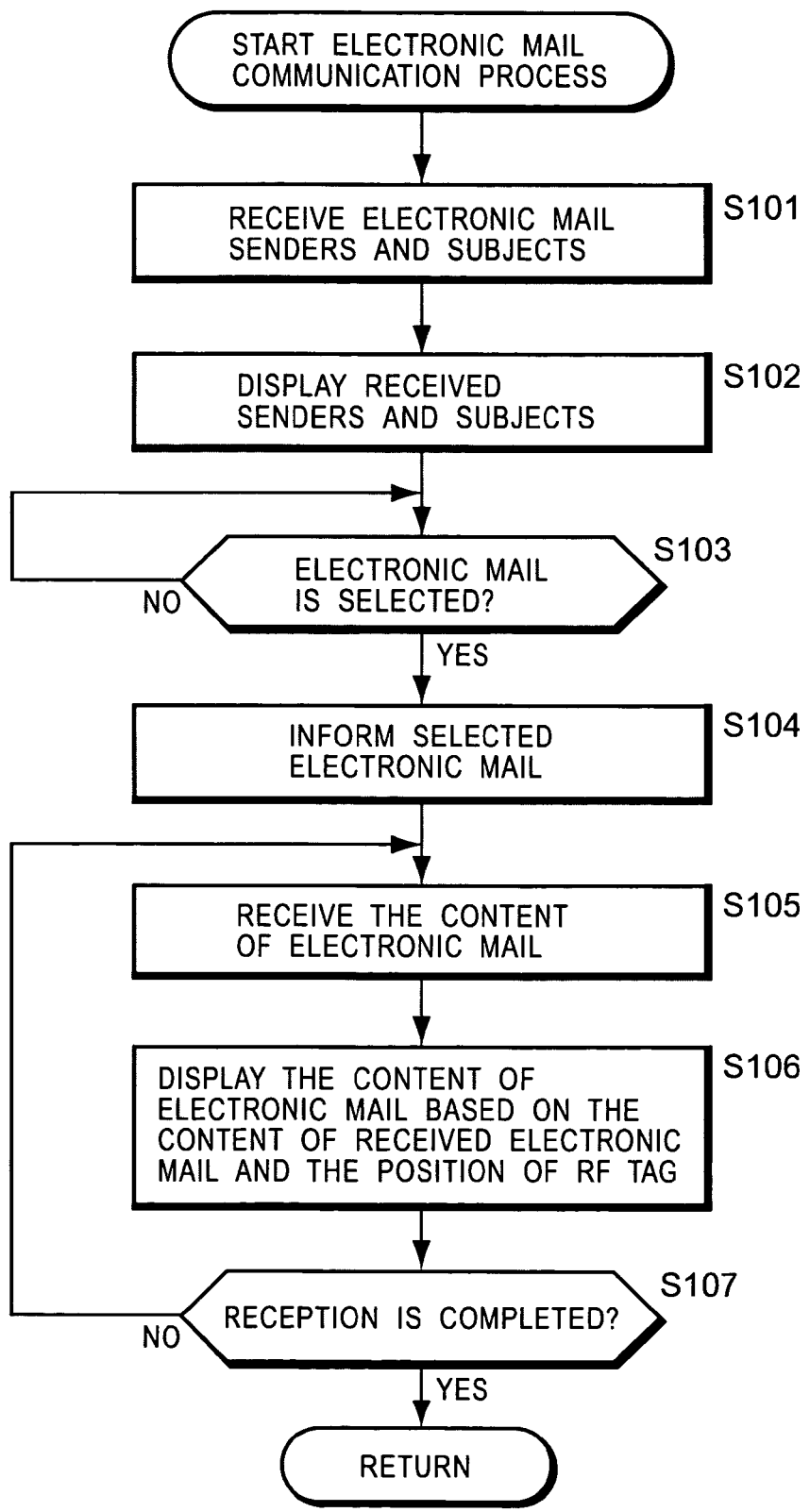
FIG. 26 is a flowchart showing an electronic mail communication process of the cellular telephone 1-2.

Another electronic mail communication process corresponding to step S26 and performed by the cellular telephone 1-2 executing the display control program 175-2 is described below with reference to the flowchart shown in FIG. 26.

The processings of steps S101 through S104 are similar to the processings of steps S61 through S64 of the flowchart shown in FIG. 24, respectively, and a description thereof is thus omitted.

In step S105, the display control program 175-2 causes the Bluetooth control program 174-2 to receive the content of the electronic mail transmitted from the communication unit 22-1. The process for receiving the content of the electronic mail is executed in parallel to the processing of steps S106 and S107.

In step S106, the display control program 175-2 displays the content of the electronic mail based on the content of the received electronic mail and the position of any communicating one of the RF tags 24-1-2 through 24-4-2.

In step S107, the display control program 175-2 obtains the communication status from the Bluetooth control program 174-2 to determine whether or not reception of the electronic mail is completed. When it is determined that reception of the electronic mail is not completed, the process returns to step S105, and the electronic mail receiving and displaying processes are repeated.

When it is determined in step S107 that reception of the electronic mail is completed, the process ends.

Since the cellular telephone 1-1 and the cellular telephone 1-2 transmit or receive an electronic mail and also display the electronic mail based on the content of the electronic mail which has been transmitted or received at this time, the user is able to immediately know that the electronic mail has been transmitted from the cellular telephone 1-1 to the cellular telephone 1-2 even when the rate of communication between the cellular telephone 1-1 and the cellular telephone 1-2 is relatively low, and is also able to know that transmission of the electronic mail is completed.

In theory, data of the electronic mail can also be exchanged by communication between the RF tag 24 and the reader/writer 23; however, the transmission capacity of this communication is small. In the present invention, therefore, this communication is used only for transmission of identification information.

The reader/writer 23 and the RF tag 24 may be provided on each of the front and rear sides of the cellular telephones 1-1 and 1-2. When data is transmitted via Bluetooth by communication between the reader/writer 23 and the RF tag 24 on the front or rear side, the cellular telephones 1-1 and 1-2 may display the transmission state of the data by changing the transparency of an image displayed on the LCD 17.

Although a single reader/writer 23 and a single RF tag 24 are disposed on each of the upper, right, left, and lower portions of the cellular telephone 1-1 and the cellular telephone 1-2 in the foregoing description, a plurality of readers/writers 23 and a plurality of RF tags 24 may be disposed on each of the upper, right, left, and lower portions of the cellular telephone 1-1 and the cellular telephone 1-2.

In this case, one of the cellular telephone 1-1 and the cellular telephone 1-2 may more accurately determine the position of the device of the other communication party adjacent thereto based on each voltage of the antennas 85 of the readers/writers 23 and the antennas 130 of the RF tags 24 to change the displayed image based on the determined position.

In the foregoing description, any of the readers/writers 23-1-1 through 23-4-1 of the cellular telephone 1-1 on the electronic mail transmitting side detects the adjacent provision of any of the RF tags 24-1-2 through 24-4-2 of the cellular telephone 1-2 on the electronic mail receiving side, the cellular telephone 1-1 requests the device name of the Bluetooth device, and the cellular telephone 1-2 transmits the Bluetooth device name; however, any of the readers/writers 23-1-2 through 23-4-2 of the cellular telephone 1-2 on the electronic mail receiving side may detect the adjacent provision of any of the RF tags 24-1-1 through 24-4-1 of the cellular telephone 1-1 on the electronic mail transmitting side, the cellular telephone 1-2 may request the device name of the Bluetooth device, and the cellular telephone 1-1 may transmit the Bluetooth device name.

The reader/writer 23 may transmit a Bluetooth device name, which is identification information, to the RF tag 24.

Although the data exchanged between the cellular telephone 1-1 and the cellular telephone 1-2 is implemented as an electronic mail in the foregoing description, the data is not limited to an electronic mail, and, for example, image, audio, or numerical data, predetermined application program data (file), or a program may be exchanged. For example, when image or numerical data is exchanged, the cellular telephone 1-1 and the cellular telephone 1-2 display the exchanged image or numerical data and update the display in the way discussed above. For example, when audio, predetermined application program data, or a program is exchanged, the cellular telephone 1-1 and the cellular telephone 1-2 display an image (for example, an image indicating the name and the data type) corresponding to the exchanged audio, predetermined application program data, or program, and update the display in the way discussed above.

Although data is exchanged between the cellular telephone 1-1 and the cellular telephone 1-2 in the foregoing description, the device used is not limited to a cellular telephone, and may be any portable equipment such as a PDA, a portable personal computer, a portable device, a digital camera, a portable game machine, a digital video camera, or an information-processor-equipped watch.

Furthermore, data may be exchanged not only between portable devices but also between a portable device and a stationary device. In this case, the stationary device may be, for example, a stationary personal computer, a navigation system, a game machine, an automatic vending machine, an ATM (automatic teller machine), a television receiver, or a video cassette recorder.

In the foregoing description, the cellular telephone 1-1 and the cellular telephone 1-2 specify a device under communication based on the device name, serving as identification information, which is informed by the RF tag 24. However, any unique identification information may be used to specify the device.

For example, in the case in which a 128-bit IPv6 (Internet Protocol version 6) address is allocated to each device, the cellular telephone 1-1 and the cellular telephone 1-2 can specify a device under communication based on this identification information informed by the RF tag 24. A Bluetooth address set in each Bluetooth module may also be used.

In the foregoing description, the terminal of the other Bluetooth communication party is specified based on identification information such as a Bluetooth device name stored in the RF tag of the cellular telephone 1; however, even when the cellular telephone 1 is not provided with an RF tag, the radio output power of the communication unit 22 serving as a wireless module (Bluetooth module) is controlled to specify the terminal of the other communication party.

A communication system in which the output power of radio waves output from a wireless module is controlled to specify the terminal of the other communication party is described below.

Figure 27:
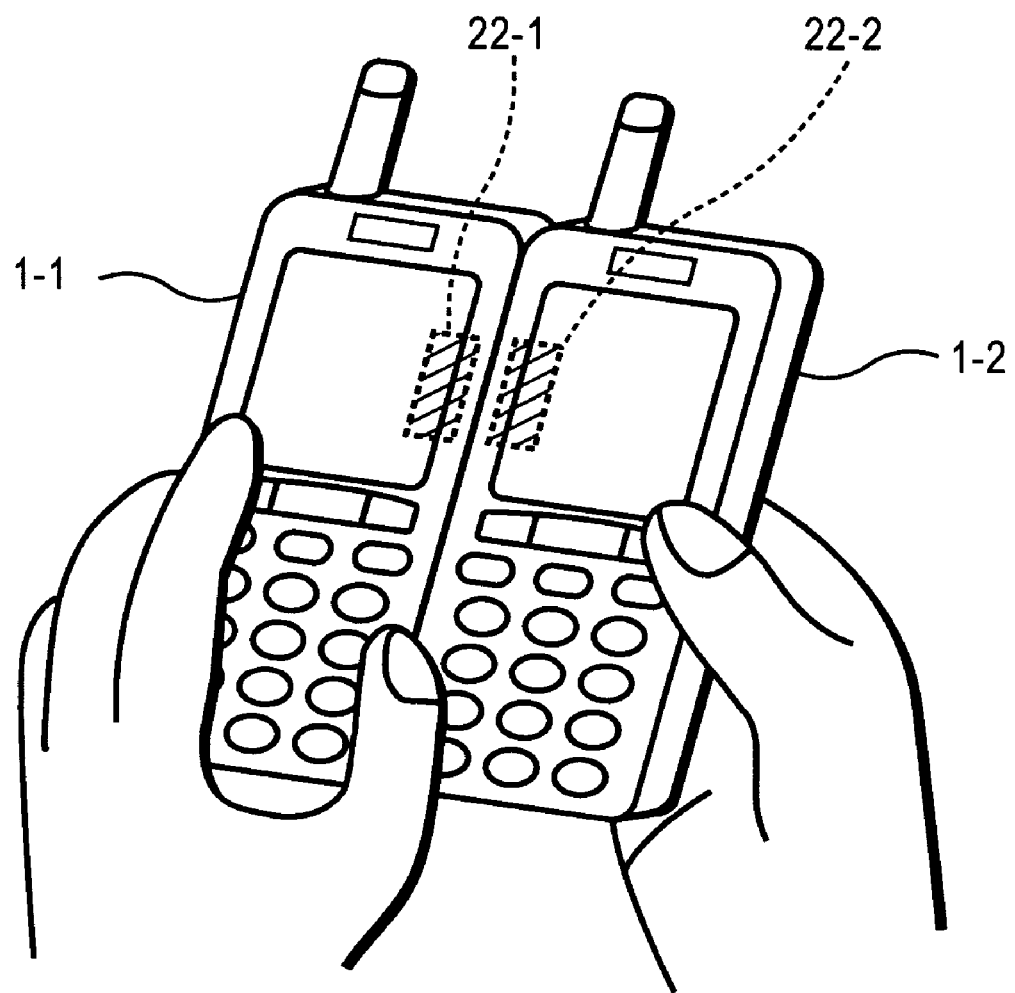
FIG. 27 is a diagram showing an example structure of a communication system according to the present invention.

FIG. 27 is a diagram showing an example structure of a communication system in which the radio output power is controlled to specify the terminal of the other communication party.

For example, in order to specify the device of the other Bluetooth communication party to set up communication with the device, first, the cellular telephone 1-1 reduces the output power of the communication unit 22-1 to the minimum so that the radiated radio waves cover only a range of, for example, several centimeters. While a power-saving mode in which the radio output power is reduced is set, the communication unit 22-1 repeatedly performs an "inquiry" to search for a terminal (communication unit) which is present in the range covered by the radio waves (for example, a range of several centimeters).

When the cellular telephone 1-1 is placed by a user adjacent to the cellular telephone 1-2 and when radio waves radiated by the communication unit 22-1 are received by the communication unit 22-2 (wireless module) of the cellular telephone 1-2, an inquiry reply is sent from the communication unit 22-2. As discussed above, an inquiry and paging are performed between the communication unit 22-1 and the communication unit 22-2 to establish a communication link. The established communication link is effective in an extremely narrow range covered by the radio waves from the communication unit 22-1 which is in the power-saving mode.

Thus, in order to allow for communication when the communication unit 22-2 is relatively far away, the communication unit 22-1 once disconnects the communication link to switch the power mode of the communication unit 22-1 from the power-saving mode to the normal power mode, and then again establishes a communication link with the communication unit 22-2 based on the previously obtained information (information obtained during the inquiry and paging in the short-distance communication).

The re-established communication link is effective in a range covered by the radio waves, such as several ten meters, as in standard Bluetooth communication. This enables the cellular telephone 1-1 and the cellular telephone 1-2 which are sufficiently distant to communicate with each other via Bluetooth.

As discussed above, even when the cellular telephone 1-1 is not provided with an RF tag having identification information stored therein, such as a Bluetooth device name, Bluetooth communication setup is achieved by controlling the output power of a communication module once a user places the cellular telephone 1-1 adjacent to the cellular telephone 1-2.

In the case in which the power mode of the communication unit 22-1 can be switched seamlessly, it is not necessary to disconnect a communication link established in the power-saving mode in order to switch the power mode from the power-saving mode to the normal power mode.

FIG. 28 is a block diagram showing an example structure of the cellular telephone 1-1 shown in FIG. 27.

The structure of the cellular telephone 1-1 shown in FIG. 28 is similar to the structure of the cellular telephone 1 shown in FIG. 2 except that the cellular telephone 1-1 shown in FIG. 28 does not include the readers/writers 23-1 through 23-4 and the RF tags 24-1 through 24-4 shown in FIG. 2, and a detailed description thereof is thus omitted as appropriate.

A CPU 11 controls the overall operation of the cellular telephone 1-1 according to a program extended from, for example, a ROM 12 to a RAM 13, and, as discussed above, controls the radio output power of the communication unit 22 (communication unit 22-1) according to the communication status.

FIG. 29 is a block diagram showing a specific example structure of the communication unit 22 shown in FIG. 28.

The communication unit 22 may be a Bluetooth module, a wireless LAN module, or the like, and the communication unit 22 which is, for example, a Bluetooth module includes the components shown in FIG. 4. The structure of the communication unit 22 (Bluetooth module) shown in FIG. 29 is a simplified version of that shown in FIG. 4 to omit the overlapping illustration.

A wireless controller 101 controls a changeover switch 104 to connect a switch 104A to a contact "a" when information is transmitted from the communication unit 22 to an external terminal, and to connect the switch 104A to a contact "b" when information transmitted from an external terminal is received. The wireless controller 101 controls the gain of a power amplifier 105 and also controls the range (output power) covered by the radio waves radiated from an antenna 107 under the control from the CPU 11 performed via the bus 14 and the input/output interface 15.

Specifically, the wireless controller 101 controls the gain of the power amplifier 105 to reduce the range covered by the radio waves radiated from the antenna 107 to the minimum when setting of the power-saving mode is instructed by the CPU 11, and controls the gain of the power amplifier 105 to increase the range covered by the output radio waves when the terminal of the other communication party can be specified and when mode switching from the power-saving mode to the normal power mode is instructed.

Similar to the baseband controller 57 shown in FIG. 4, a baseband controller 102 controls a baseband signal of transmission and received signals. A modulation/demodulation processor 103 GFSK modulates or spreads the output from the baseband controller 102 based on the hopping frequency, and outputs the resulting signal from the antenna 107 via the power amplifier 105. The modulation/demodulation processor 103 also de-spreads or GFSK demodulates the output from an LNA (Low Noise Amplifier), and outputs the resulting signal to the baseband controller 102.

The structure of the cellular telephone 1-2 is similar to the structure of the cellular telephone 1-1 shown in FIG. 28.

The operation of the communication system shown in FIG. 27 is described below with reference to the flowchart shown in FIG. 30. In this example, the operation of specifying the other Bluetooth communication party and setting up a communication is described.

For example, when Bluetooth communication is instructed by a user, the communication unit 22-1 of the cellular telephone 1-1 is activated under the control from the CPU 11-1 to set the power mode thereof to the power-saving mode in step S201. The process proceeds to step S202, in which the communication unit 22-1 repeatedly performs an inquiry to search for an adjacent terminal. During the inquiry performed in step S202, since the power-saving mode is set and the range covered by the radio waves is reduced to the minimum, for example, IQ packets (inquiry packets) are repeatedly broadcasted in a range of several centimeters from the antenna 107-1 (the antenna of the communication unit 22-1 of the cellular telephone 1-1).

Meanwhile, in step S211, the communication unit 22-2 of the cellular telephone 1-2 repeatedly performs an inquiry scan and a page scan, and stands by until an inquiry and paging are requested from the other terminal.

When a user places the cellular telephone 1-1 adjacent to the cellular telephone 1-2 and the communication unit 22-2 of the cellular telephone 1-2 is present in the range covered by the radio waves from the communication unit 22-1 of the cellular telephone 1-1, an IQ packet broadcasted from the communication unit 22-1 is received by the communication unit 22-2 in step S222.

When the IQ packet broadcasted from the communication unit 22-1 is received, the process proceeds to step S223, in which, in response, the communication unit 22-2 of the cellular telephone 1-2 transmits an FHS packet to the communication unit 22-1. The FHS packet includes attribute information of the cellular telephone 1-2 (Bluetooth slave), such as information indicating the Bluetooth address and Bluetooth clock of the cellular telephone 1-2.

When the FHS packet transmitted from the communication unit 22-2 is received in step S203, the process proceeds to step S204, in which the communication unit 22-1 issues a connection request to the communication unit 22-2.

That is, an ID packet is transmitted from the communication unit 22-1 to the communication unit 22-2. When the same ID packet as that ID packet is returned from the communication unit 22-2 to the communication unit 22-1, an FHS packet including the Bluetooth address and Bluetooth clock of the communication unit 22-1 is transmitted from the communication unit 22-1 to the communication unit 22-2.

When the FHS packet transmitted from the communication unit 22-1 is received by the communication unit 22-2 in step S224, synchronization in frequency (frequency hopping pattern) and time (time slot) is set up between the communication unit 22-1 and the communication unit 22-2, so that a data link (communication link) is established therebetween (state 1).

For example, when a Bluetooth data link is established first between the communication unit 22-1 and the communication unit 22-2, in step S205, the communication unit 22-1 transmits a PIN (Personal Identification Number) code to the communication unit 22-2 for mutual authentication. The PIN code transmitted from the communication unit 22-1 is received by the communication unit 22-2 in step S225, and, then, various link keys are set up between the communication unit 22-1 and the communication unit 22-2 based on the PIN code, random number, and so on. The PIN code may be encoded using a public key supplied from the communication unit 22-2 to the communication unit 22-1 before it is transmitted and received. That is, in this case, the communication unit 22-2 manages a secret key corresponding to the public key supplied to the communication unit 22-1. This improves the security to more reliably perform Bluetooth communication only between the cellular telephone 1-1 and the cellular telephone 1-2.

Since the thus established communication link is effective in a range of several centimeters covered by the radio waves from the communication unit 22-1 which is in the power-saving mode, the communication unit 22-1 issues a request for temporary disconnection of the data link to the communication unit 22-2 in step S206 in order to switch the power mode so as to allow for communication when the communication unit 22-2 is relatively far away. The information obtained from the previous processings, such as the Bluetooth address and PIN code of the communication unit 22-2, is stored in the communication unit 22-1.

The communication unit 22-2 which receives the request in step S226 stores the information obtained from the previous processings, such as the Bluetooth address and PIN code of the communication unit 22-1, similarly to the communication unit 22-1, and disconnects the data link (state 2).

In step S207, the communication unit 22-1 of the cellular telephone 1-1 sets the power mode, in which the output power is controlled, to the normal power mode under the control from the CPU 11-1 in order to establish a data link with the communication unit 22-2 again. Thus, the Bluetooth radio waves from the communication unit 22-1 can cover a range of, for example, several ten meters.

The process proceeds to step S208, in which the communication unit 22-1 specifies the cellular telephone 1-2 as the terminal of the other communication party based on the information stored immediately before the disconnection of the data link, and issues a connection request to the communication unit 22-2 of the cellular telephone 1-2.

In step S227, the request is received by the communication unit 22-2, and a connection is set up between both terminals, so that a data link is established between the communication unit 22-1 and the communication unit 22-2. That is, Bluetooth communication is allowed in a range covered by the radio waves from the communication unit 22-1 which is in the normal power mode, such as several ten meters (state 3).

In the way discussed above, the communication system shown in FIG. 27 which specifies an adjacent terminal as the terminal of the other communication party is applied to the communication system shown in FIG. 1, and, for example, display of the mail transmitted via Bluetooth from the cellular telephone 1-1 to the cellular telephone 1-2 is controlled based on the orientation of the adjacent terminal.

Specifically, in this case, communication units 22-1-1 through 22-4-1 shown in FIG. 31 are disposed at the position corresponding to the readers/writers 23-1-1 through 23-4-1 and the RF tags 24-1-1 through 24-4-1 arranged on the cellular telephone 1-1 in the manner shown in FIG. 9. Communication units 22-1-2 through 22-4-2 shown in FIG. 31 are further disposed at the position corresponding to the readers/writers 23-1-2 through 23-4-2 and the RF tags 24-1-2 through 24-4-2 arranged on the cellular telephone 1-2 in the manner shown in FIG. 9.

The adjacent communication units between which a communication link is established control display of the data under transmission.

As an example, if the cellular telephone 1-1 and the cellular telephone 1-2 are placed side-by-side in the manner shown in FIG. 8, a communication link is established according to the process shown in FIG. 30 only between the communication unit 22-3-1 of the cellular telephone 1-1 and the communication unit 22-2-2 of the cellular telephone 1-2, and display of the data transmitted from the cellular telephone 1-1 to the cellular telephone 1-2 is controlled in the manner shown in FIGS. 10 through 12.

As another example, if the cellular telephone 1-1 and the cellular telephone 1-2 are placed adjacent to each other in such a manner that the top side of the cellular telephone 1-1 faces the top side of the cellular telephone 1-2 in the manner shown in FIG. 13, a communication link is established according to the process shown in FIG. 30 only between the communication unit 22-1-1 of the cellular telephone 1-1 and the communication unit 22-1-2 of the cellular telephone 1-2, and display of the data transmitted from the cellular telephone 1-1 to the cellular telephone 1-2 is controlled in the manner shown in FIGS. 15 through 17.

As another example, if the right side of the cellular telephone 1-1 is adjacent to the top side of the cellular telephone 1-2 in the manner shown in FIG. 18, a communication link is established according to the process shown in FIG. 30 only between the communication unit 22-3-1 of the cellular telephone 1-1 and the communication unit 22-1-2 of the cellular telephone 1-2, and display of the data transmitted from the cellular telephone 1-1 to the cellular telephone 1-2 is controlled in the manner shown in FIGS. 18 through 20.

Therefore, even when no RF tag is provided, the radio output power is controlled to specify the orientation of both adjacent terminals (communication units), thus making it possible to control display of the data under transmission.

The above-described series of processes may be executed by hardware or software. If the series of processes is executed by software, a program constructing the software is installed from a recording medium to a computer incorporated in a dedicated hardware or to device capable of achieving various functions by installing various programs, such as a general-purpose personal computer.

The recording medium is constructed of not only packaged media having programs recorded therein and distributed separately from a computer to provide a program for a user, such as the magnetic disc 31 (including a floppy (registered trademark) disc), the optical disc 32 (including a CD-ROM (Compact Disc-Read Only Memory) and a DVD (Digital Versatile Disc)), the magneto-optical disc 33 (including an MD (Mini-Disc)(trademark)), and the semiconductor memory 34 shown in FIG. 2, but also devices having the program stored therein and incorporated in advance in a computer provided for a user, such as the ROM 12, the recording unit 18, and a hard disk (not shown).

A program executing the above-described series of processes may be installed to a computer via wired or wireless communication media such as a local area network, the Internet, and digital satellite broadcasting via interfaces such as a router and a modem, if necessary.

As is used herein, the steps describing a program stored in a recording medium include steps performed in a time-series manner according to the described order and steps performed in a parallel or discrete manner although the steps are not necessarily performed in a time-series manner.

INDUSTRIAL APPLICABILITY

According to the present invention, therefore, users can immediately and easily know whether or not transmission of desired data is completed and know the direction of transmission of the data.

The invention claimed is:

1. An information processing apparatus comprising:
   detecting means for detecting an electronic device placed adjacent to the information processing apparatus and for detecting a direction in which the electronic device is placed;
   obtaining means for obtaining identification information of the electronic device upon detection of the electronic device;
   communication means for communicating with the electronic device over a network based on the identification information; and
   display control means for controlling display so that an image or textual information corresponding to at least one of the communication status of data communicated over the network and the content of the data is displayed based on the direction in which the electronic device is placed, wherein:
      the detecting means comprises at least four read/writer devices, the read/writer devices being positioned on a left side, a right side, a top, and a bottom of the information processing apparatus, and
      the direction in which the electronic device is placed is towards one of the left side, the right side, the top, and the bottom.

2. An information processing apparatus according to claim 1, wherein the display control means controls display so that the image or textual information is displayed in a manner corresponding to reception or transmission of the data.

3. An information processing apparatus according to claim 2, wherein the display control means controls display so that the image or textual information is displayed in a manner corresponding to reception or transmission of the data when the communication of the data is completed.

4. An information processing apparatus comprising:
   detecting means for detecting an electronic device placed adjacent to the information processing apparatus and for detecting a direction in which the electronic device is placed;
   obtaining means for obtaining identification information of the electronic device upon detection of the electronic device;
   communication means for communicating with the electronic device over a network based on the identification information; and
   display control means for controlling display so that an image or textual information corresponding to at least one of the communication status of data communicated over the network and the content of the data is displayed based on the direction in which the electronic device is placed, wherein the display control means:
   controls display so that the image or textual information is displayed in a manner corresponding to reception or transmission of the data, and
   controls display so that, when the data is received, a display area of the image or textual information increases from the direction in which the electronic device is placed, and controls display so that, when the data is transmitted, the display area of the image or textual information decreases in the direction in which the electronic device is placed.

5. An information processing apparatus according to claim 4, wherein the display control means controls display so that, when the data is received, the display area of the image or textual information increases by adding the received data, and controls display so that, when the data is transmitted, the display area of the image or textual information decreases by deleting the transmitted data from the image or textual information.

6. An information processing method comprising:
   detecting an electronic device placed adjacent to an information processing apparatus;
   detecting a direction in which the electronic device is placed;
   obtaining identification information of the electronic device upon detection of the electronic device;
   communicating with the electronic device over a network based on the identification information; and
   controlling display so that an image or textual information corresponding to at least one of the communication status of data communicated over the network and the content of the data is displayed based on the direction in which the electronic device is placed, wherein:
      at least one of four reader/writer devices detect the electronic device, the read/writer devices being positioned on a left side, a right side, a top, and a bottom of the information processing apparatus, and
      the direction in which the electronic device is placed is towards one of the left side, the right side, the top, and the bottom.

7. A recording medium having a program recorded therein, the program causing a computer to execute an information process including:
   detecting an electronic device placed adjacent to an information processing apparatus;
   detecting a direction in which the electronic device is placed;
   obtaining identification information of the electronic device upon detection of the electronic device;
   communicating with the electronic device over a network based on the identification information; and
   controlling display so that an image or textual information corresponding to at least one of the communication status of data communicated over the network and the content of the data is displayed based on the direction in which the electronic device is placed, wherein:
      at least one of four reader/writer devices detect the electronic device, the read/writer devices being positioned on a left side, a right side, a top, and a bottom of the information processing apparatus, and
      the direction in which the electronic device is placed is towards one of the left side, the right side, the top, and the bottom.

8. An information processing method comprising:
   detecting an electronic device placed adjacent to an information processing apparatus;
   detecting a direction in which the electronic device is placed;
   obtaining identification information of the electronic device upon detection of the electronic device;
   communicating with the electronic device over a network based on the identification information; and
   controlling display so that an image or textual information corresponding to at least one of the communication status of data communicated over the network and the content of the data is displayed based on the direction in which the electronic device is placed, wherein:

the image or textual information is displayed in a manner corresponding to reception or transmission of the data, and when the data is received, a display area of the image or textual information increases from the direction in which the electronic device is placed, and when the data is transmitted, the display area of the image or textual information decreases in the direction in which the electronic device is placed.

9. An information processing method according to claim 8, wherein when the data is received, the display area of the image or textual information increases by adding the received data, and controls display so that, when the data is transmitted, the display area of the image or textual information decreases by deleting the transmitted data from the image or textual information.

10. A recording medium comprising instructions which, when executed by a processor, perform a method comprising:

detecting an electronic device placed adjacent to an information processing apparatus;

detecting a direction in which the electronic device is placed;

obtaining identification information of the electronic device upon detection of the electronic device;

communicating with the electronic device over a network based on the identification information; and controlling display so that an image or textual information corresponding to at least one of the communication status of data communicated over the network and the content of the data is displayed based on the direction in which the electronic device is placed, wherein:

the image or textual information is displayed in a manner corresponding to reception or transmission of the data, and when the data is received, a display area of the image or textual information increases from the direction in which the electronic device is placed, and controls display so that, when the data is transmitted, the display area of the image or textual information decreases in the direction in which the electronic device is placed.

11. A recording medium according to claim 10, wherein when the data is received, the display area of the image or textual information increases by adding the received data, and when the data is transmitted, the display area of the image or textual information decreases by deleting the transmitted data from the image or textual information.

* * * * *